(12) United States Patent
Dohi et al.

(10) Patent No.: US 6,236,571 B1
(45) Date of Patent: May 22, 2001

(54) ATTACHMENT DEVICE OF PORTABLE ELECTRONIC EQUIPMENT AND FEATURE EXPANDING UNIT OF PORTABLE ELECTRONIC EQUIPMENT, AND SEPARATION TYPE FEATURE EXPANDING DEVICE OF PORTABLE ELECTRONIC EQUIPMENT COMPRISING ATTACHMENT DEVICE AND FEATURE EXPANDING UNIT

(75) Inventors: Hidemi Dohi; Shoichi Sunagawa; Shinichi Yamaguchi; Toshio Ikeuchi, all of Tottori; Mikio Adachi, Shimane, all of (JP)

(73) Assignees: Sanyo Electric Co., Ltd., Osaka; Tottori Sanyo Electric Co., Ltd., Tottori; Shimane Sanyo Industrial Co., Shimane, all of (JP)

( * ) Notice: Subject to any disclaimer, the term of this patent is extended or adjusted under 35 U.S.C. 154(b) by 0 days.

(21) Appl. No.: 09/360,519

(22) Filed: Jul. 23, 1999

Related U.S. Application Data

(62) Division of application No. 08/825,467, filed on Mar. 28, 1997, now Pat. No. 5,959,835.

(30) Foreign Application Priority Data

Mar. 29, 1996 (JP) .......................................................... 8-75835
Mar. 29, 1996 (JP) .......................................................... 8-75836
Mar. 29, 1996 (JP) .......................................................... 8-75837

(51) Int. Cl.[7] ................................. G06F 1/16; H05K 5/02

(52) U.S. Cl. ........................... 361/727; 361/683; 361/686; 364/708.1; 439/638

(58) Field of Search ..................................... 361/683, 686, 361/724, 727; 439/638, 928; 364/708.1; 312/223.2; G06F 1/16

(56) References Cited

U.S. PATENT DOCUMENTS

| | | | |
|---|---|---|---|
| 4,788,658 | * 11/1988 | Hanebuth | 364/900 |
| 4,903,222 | * 2/1990 | Carter et al. | 364/708 |
| 5,030,128 | * 7/1991 | Herron et al. | 439/372 |
| 5,159,533 | * 10/1992 | Kuang | 361/391 |
| 5,313,596 | * 5/1994 | Swindler et al. | 395/325 |
| 5,323,291 | * 6/1994 | Boyle et al. | 361/683 |
| 5,434,743 | 7/1995 | Hosoya et al. . | |
| 5,436,792 | 7/1995 | Leman et al. . | |

(List continued on next page.)

FOREIGN PATENT DOCUMENTS

| | | | |
|---|---|---|---|
| 0 407 068 A2 | 1/1991 | (EP) . | |
| 4-195504 | 7/1992 | (JP) . | |
| 7-36577 | * 2/1995 | (JP) | G06F/3/00 |
| 7-84689 | * 3/1995 | (JP) | G06F/3/00 |
| 9-230959 | * 9/1997 | (JP) | G06F/1/16 |
| 9-269848 | * 10/1997 | (JP) | G06F/1/16 |

*Primary Examiner*—Leo P. Picard
*Assistant Examiner*—Anatoly Vortman
(74) *Attorney, Agent, or Firm*—Arent Fox Kintner Plotkin & Kahn

(57) ABSTRACT

A separation type feature expanding device comprises an attachment device comprising a bottom supporting flat portion on which a notebook personal computer is mounted, and a port replicator portion provided in a rear end of the bottom supporting flat portion and having a terminal portion to which a terminal portion provided on the back surface of the notebook personal computer is removably connected, and a feature expanding unit containing one or more feature expanding devices of the notebook personal computer, having its upper end surface on which the bottom supporting flat portion in the attachment device is mounted, and having a terminal portion to which the terminal portion of the port replicator portion in the attachment device is removably connected.

6 Claims, 31 Drawing Sheets

U.S. PATENT DOCUMENTS

| | | |
|---|---|---|
| 5,459,637 | 10/1995 | Ma et al. . |
| 5,460,547 | 10/1995 | Belt et al. . |
| 5,535,093 * | 7/1996 | Noguchi et al. ............... 361/686 |
| 5,557,562 * | 9/1996 | Yoshiharu et al. ............ 364/708.1 |
| 5,694,292 * | 12/1997 | Paulsel et al. ................ 361/686 |
| 5,805,412 | 9/1998 | Yanagisawa et al. . |
| 5,870,283 * | 2/1999 | Maeda et al. ................. 361/686 |
| 5,948,074 * | 9/1999 | Ninomiya ........................ 710/2 |
| 5,959,835 * | 9/1999 | Dohi et al. .................... 361/686 |
| 6,040,681 * | 3/2000 | May ............................... 320/113 |

* cited by examiner

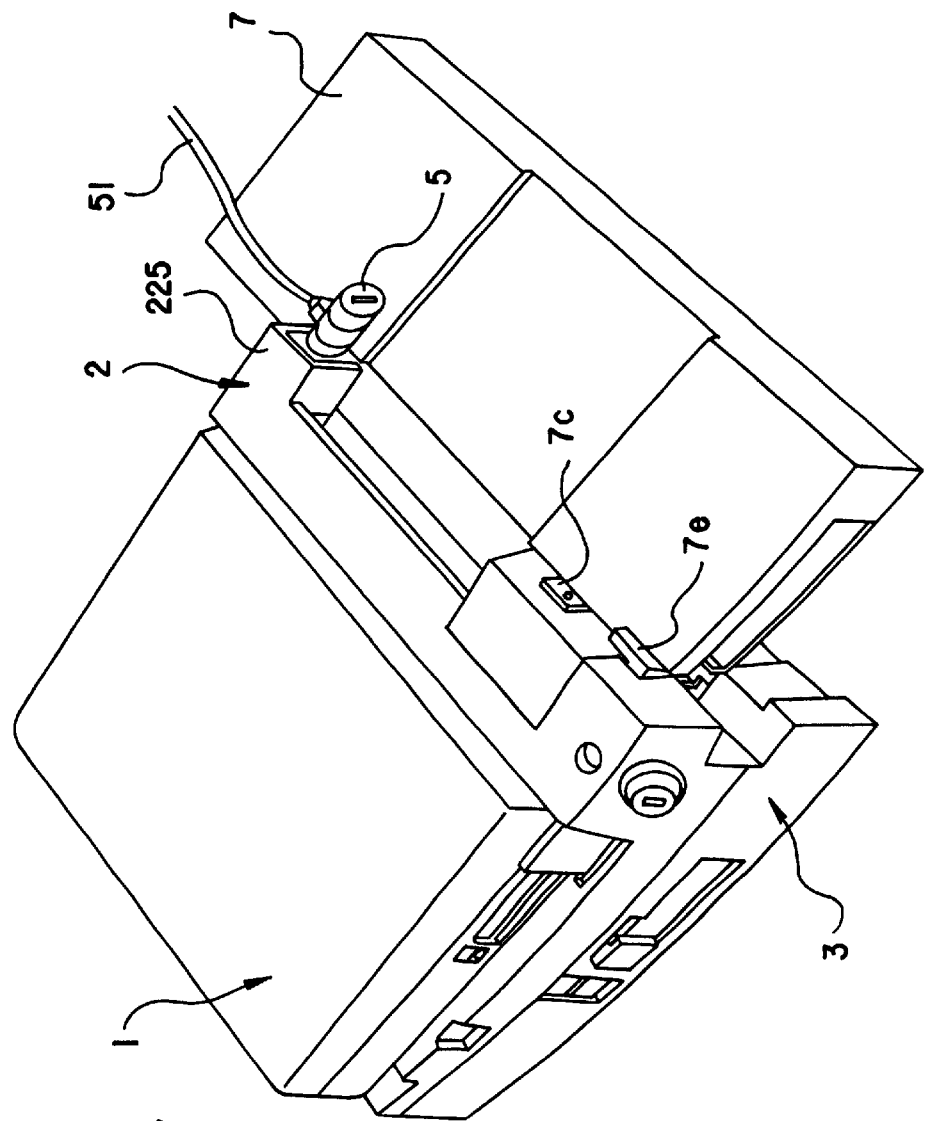

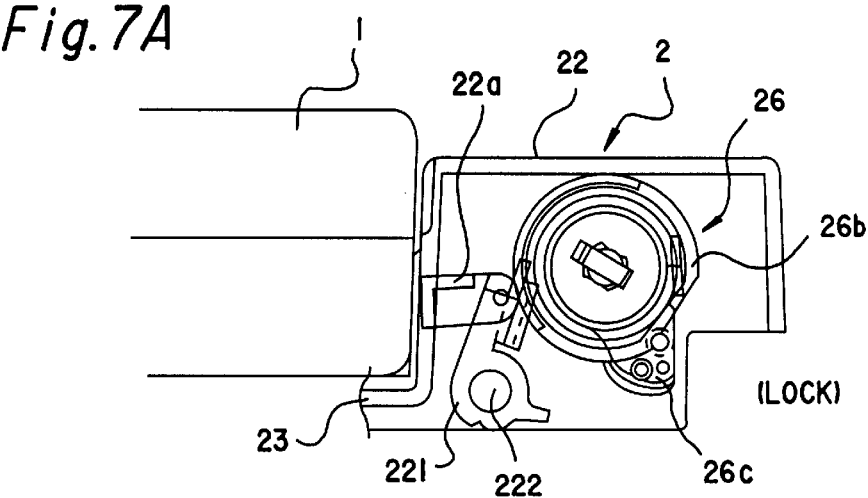
Fig.7A (LOCK)
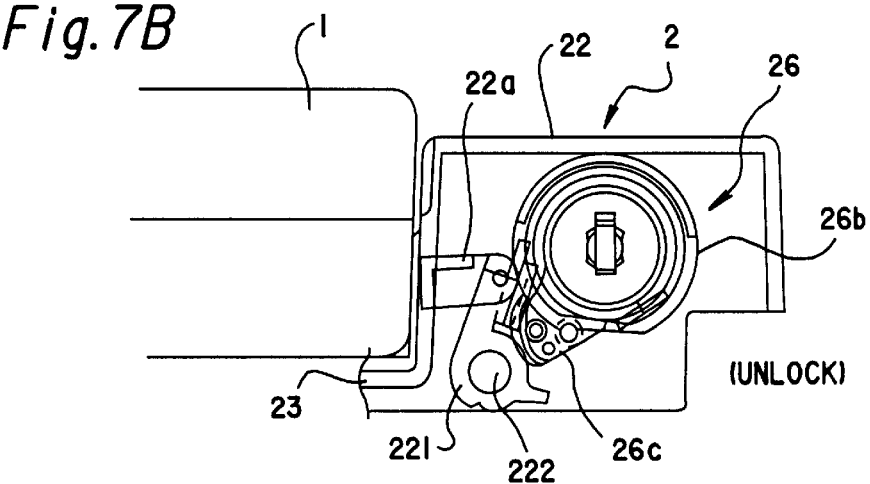
Fig.7B (UNLOCK)
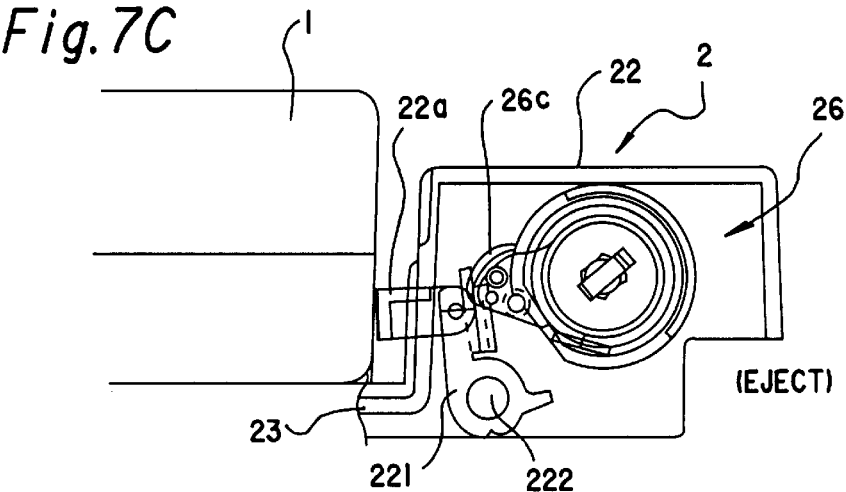
Fig.7C (EJECT)

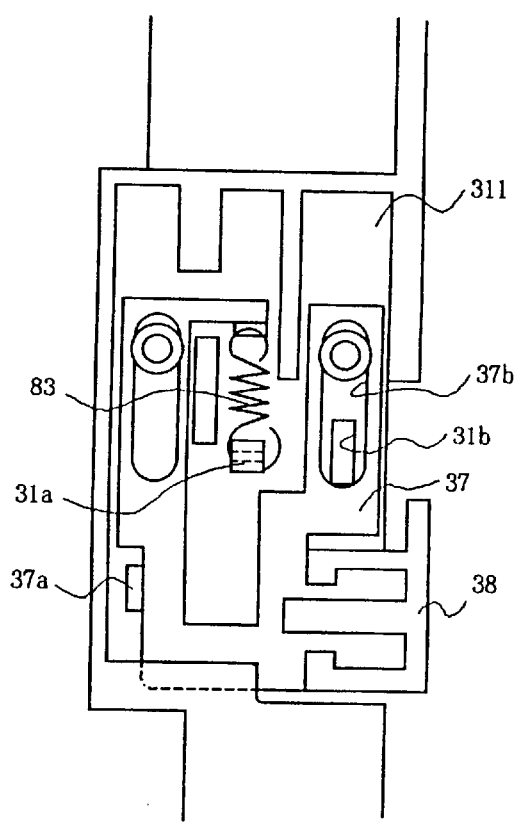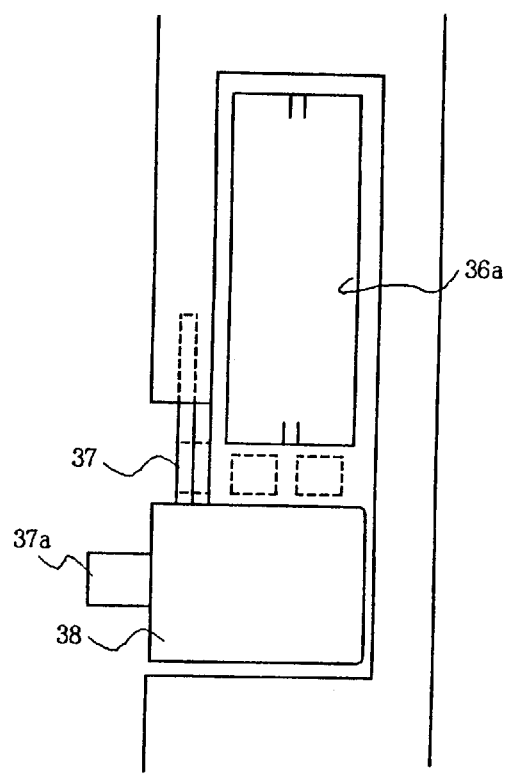

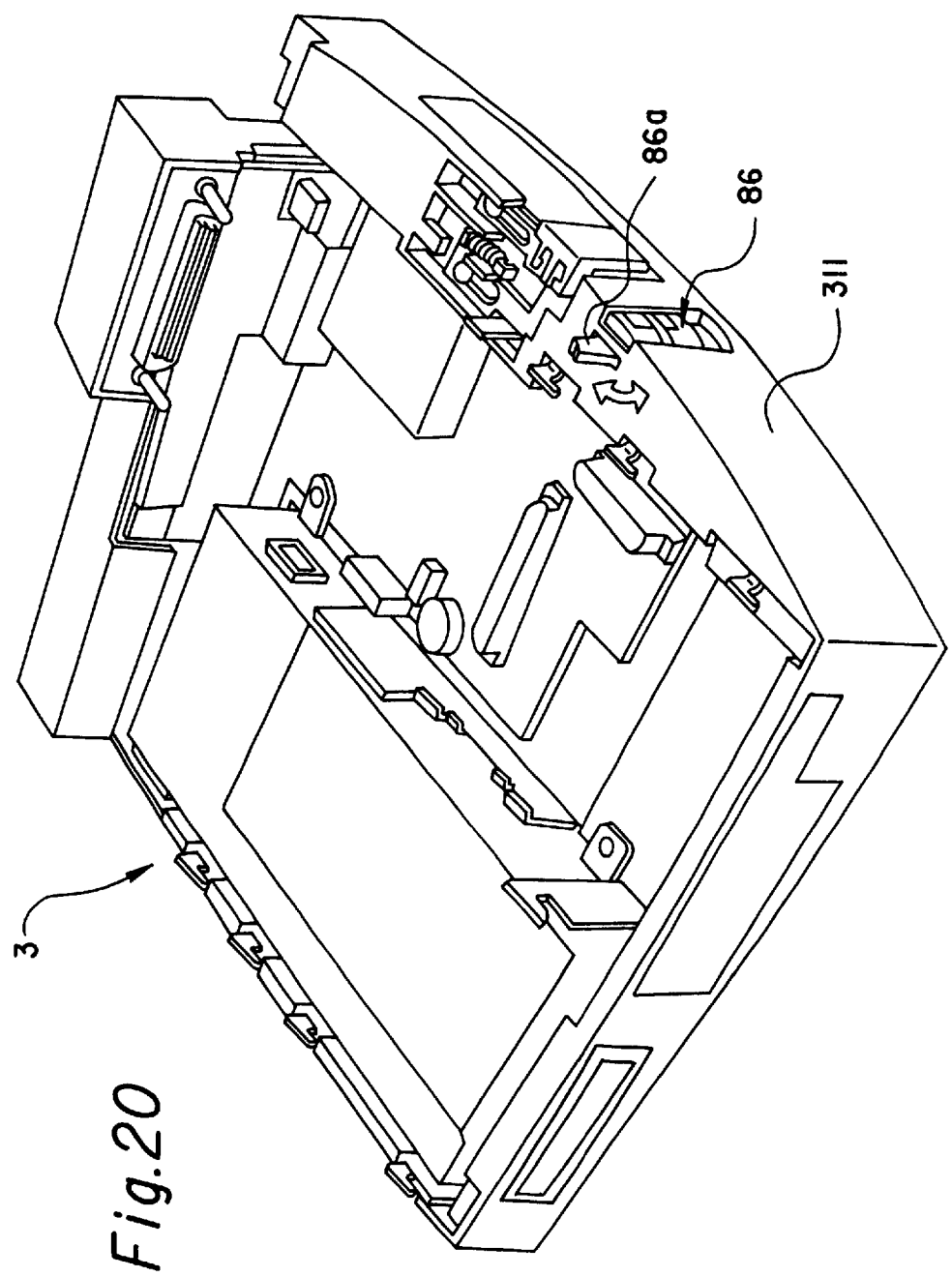

unlock lock

ATTACHMENT DEVICE OF PORTABLE ELECTRONIC EQUIPMENT AND FEATURE EXPANDING UNIT OF PORTABLE ELECTRONIC EQUIPMENT, AND SEPARATION TYPE FEATURE EXPANDING DEVICE OF PORTABLE ELECTRONIC EQUIPMENT COMPRISING ATTACHMENT DEVICE AND FEATURE EXPANDING UNIT

RELATED APPLICATION

This application is a divisional application of prior application Ser. No. 08/825,467 filed Mar. 28,1997, now U.S. Pat. No. 5,959,835 issued Sep. 28, 1999.

BACKGROUND OF THE INVENTION

1. Field of the Invention

The present invention relates to an attachment device of a portable electronic equipment and a feature expanding unit of the portable electronic equipment, and a separation type feature expanding device of the portable electronic equipment comprising the attachment device and the feature expanding unit.

2. Description of the Prior Art

In order to ensure the portability of portable electronic equipment such as a so-called notebook type personal computer or laptop type personal computer as well as expand the feature thereof, it has been proposed that a feature expanding unit containing a circuit for expanding the feature of the portable electronic equipment is provided and the portable electronic equipment is mounted on and removed from the feature expanding unit, as disclosed in Japanese Utility Model Laid-Open No. 119220/1991, for example.

The feature expanding unit and the portable electronic equipment are electrically connected to each other by inserting a male connector provided in the portable electronic equipment into a female connector provided in the feature expanding unit, for example. Further, there is provided means for inhibiting the relative movement therebetween in the direction in which the connectors are inserted and pulled out in order that the connectors are uselessly disconnected from each other.

Furthermore, the portable electronic equipment is provided with a connector for connecting equipment such as a printer or a scanner using a cable. When the cable is attached or detached every time the printer, the scanner, or the like is used, the portable electronic equipment is inconvenient for use. Therefore, the equipment such as the printer or scanner and a port replicator are constantly connected to each other by the cable, while the portable electronic equipment is removably provided in the port replicator (the port replicator and the port replicator portion refer to one comprising a first group of terminals to which a group of terminals of the portable electronic equipment is connected and a second group of terminals to which a group of terminals of the equipment such as the printer is connected), to decrease the complexity of connecting work of the cable.

When the feature of the portable electronic equipment is gradually expanded, the above-mentioned port replicator is liable to be first obtained, after which a feature expanding unit is liable to be newly obtained. When the feature expanding unit is newly obtained in a case where the port replicator has been already possessed, however, the port replicator which has been already possessed is useless, which means a waste of property.

SUMMARY OF THE INVENTION

The present invention has been made in view of the above-mentioned circumstances, and has for its object to prevent equipment which has been already possessed from being useless in a case where the feature of a portable electronic equipment is gradually expanded, and to provide an attachment device of the portable electronic equipment, a feature expanding unit of the portable electronic equipment, and a separation type feature expanding device of the portable electronic equipment comprising the attachment device and the feature expanding unit.

Another object of the present invention is to prevent the situation where the feature expanding unit of the portable electronic equipment and the attachment device of the portable electronic equipment are stolen.

A separation type feature expanding device of a portable electronic equipment according to the present invention is a separation type feature expanding device of a portable electronic equipment which is separably provided with an attachment device of the portable electronic equipment which comprises a bottom supporting flat portion on which the portable electronic equipment is mounted, and a port replicator portion provided in a rear end of the bottom supporting flat portion and having a terminal portion to which a terminal portion provided on the rear surface of the portable electronic equipment is removably connected, and locking means, and a feature expanding unit of the portable electronic equipment which contains one or more feature expanding means of the portable electronic equipment, has its upper end surface on which the bottom supporting flat portion in the attachment device of the portable electronic equipment is mounted, and has a terminal portion to which the terminal portion of the port replicator portion in the attachment device of the portable electronic equipment is removably connected, which is characterized in that an engaging projection is formed on the upper surface of the feature expanding unit of the portable electronic equipment, an engaging hole into which the engaging projection is inserted is formed on the bottom surface of the bottom supporting flat portion in the attachment device of the portable electronic equipment, the bottom supporting flat portion is provided with a moving plate moved upon being operated by the locking means, and the moving plate is engaged with the engaging projection by an operation performed at the time of locking by the locking means to prevent the movement of the attachment device.

In such a construction, the attachment device of the portable electronic equipment cannot be removed from the feature expanding unit of the portable electronic equipment in a locked state by the locking means, so that the attachment device can be prevented from being stolen.

A separation type feature expanding device of a portable electronic equipment according to the present invention is a separation type feature expanding device of a portable electronic equipment which is separably provided with an attachment device of the portable electronic equipment which comprises a bottom supporting flat portion on which the portable electronic equipment is mounted, and a port replicator portion provided in a rear end of the bottom supporting flat portion and having a terminal portion to which a terminal portion provided on the rear surface of the portable electronic equipment is removably connected, and locking means, and a feature expanding unit of the portable electronic equipment which contains one or more feature expanding means of the portable electronic equipment, has its upper end surface on which the bottom supporting flat portion in the attachment device of the portable electronic equipment is mounted, and has a terminal portion to which the terminal portion of the port replicator portion in the attachment device of the portable electronic equipment is removably connected, and a card loading portion, which is characterized in that the bottom supporting flat portion in the attachment device is provided with a moving plate moved upon being operated by the locking means, the feature expanding unit is provided with a shutter driving plate moved by the moving plate, and the shutter driving plate is driven by an operation performed at the time of locking by the locking means so that at least a part of a card loading aperture of the card loading portion is closed by a shutter plate mounted on the shutter driving plate.

In such a construction, a card cannot be taken out from the feature expanding unit of the portable electronic equipment in a locked state by the locking means, so that the card can be prevented from being stolen.

A separation type feature expanding device of a portable electronic equipment according to the present invention is a separation type feature expanding device of a portable electronic equipment which is separably provided with an attachment device of the portable electronic equipment which comprises a bottom supporting flat portion on which the portable electronic equipment is mounted, a port replicator portion provided in a rear end of the bottom supporting flat portion and having a terminal portion to which a terminal portion provided on the back surface of the portable electronic equipment is removably connected, and locking means, a feature expanding unit of the portable electronic equipment which contains one or more feature expanding means of the portable electronic equipment, has its upper end surface on which the bottom supporting flat portion in the attachment device of the portable electronic equipment is mounted, and has a terminal portion to which the terminal portion of the attachment device of the portable electronic equipment is removably connected and a terminal portion to which a terminal portion of the other equipment is removably connected, and a case carrying an electronic substrate having a terminal portion removably connected to the terminal portions of the feature expanding unit of the portable electronic equipment, which is characterized in that an insertion hole is formed in a cover portion covering the locking means in the attachment device of the portable electronic equipment, an engaging projection which can be inserted into the insertion hole in the cover portion is formed in the electronic substrate carrying case, and the locking means is provided with an engaging member engaged with the engaging projection by an operation performed at the time of locking.

In such a construction, the electronic substrate carrying case cannot be removed in a locked state by the locking means, so that it can be prevented from being stolen.

An attachment device of a portable electronic equipment according to the present invention is an attachment device of a portable electronic equipment which comprises a bottom supporting flat portion on which the portable electronic equipment is mounted, a port replicator portion provided in a rear end of the bottom supporting flat portion and having a terminal portion to which a terminal portion provided on the back surface of the portable electronic equipment is removably connected, and locking means, which is characterized in that a rotation engaging claw having a gear portion is rotatably provided in the bottom supporting flat portion so that its claw portion can be projected from the upper surface of the bottom supporting flat portion, a rack hole formed in a moving plate moved upon being operated by the locking means is engaged with the gear portion, and the claw portion is projected from the bottom supporting flat portion by an operation at the time of locking performed by the locking means to engage the portable electronic equipment.

In such a construction, the portable electronic equipment can be engaged upon projecting the claw portion of the rotation engaging claw from the bottom supporting flat portion by the operation performed at the time of locking by the locking means. The rotation engaging claw is rotated in a so-called relationship between a rack (the rack hole of the moving plate) and a pinion (the gear portion). Therefore, the distance between a center of rotation of the rotation engaging claw and a point of application for applying torque to the rotation engaging claw can be decreased, whereby the thickness of the bottom supporting flat portion in the attachment device of the portable electronic equipment can be reduced.

An attachment device of a portable electronic equipment according to the present invention is an attachment device of a portable electronic equipment which comprises a bottom surface flat portion on which the portable electronic equipment is mounted, a port replicator portion provided in a rear end of the bottom supporting flat portion and having a terminal portion to which a terminal portion provided on the back surface of the portable electronic equipment is removably connected, and locking means, which is characterized in that a pressing projection for ejecting the portable electronic equipment is provided movably back and forth on the front surface of the port replicator portion, an eject shaft is so provided in the bottom supporting flat portion as to have the center of a shaft in the lateral direction, the pressing projection is moved back and forth by the rotation of the eject shaft, and the eject shaft is rotated when the locking means is further operated in the direction of an operation performed when a locked state by the locking means is changed into an unlocked state beyond the unlocked state.

In such a construction, an operation for ejecting the portable electronic equipment can be performed subsequently to an operation of changing the locked state by the locking means into the unlocked state, whereby the separation type feature expanding device of the portable electronic equipment can be made convenient for use.

An attachment device of a portable electronic equipment according to the present invention is an attachment device of a portable electronic equipment which comprises a bottom supporting flat portion on which the portable electronic equipment is mounted, a port replicator portion provided in a rear end of the bottom supporting flat portion and having a terminal portion to which a terminal portion provided on the back surface of the portable electronic equipment is removably connected, and locking means, which is characterized in that a moving plate moved upon being operated by the locking means is connected to an upper case portion constituting a case of the bottom supporting flat portion, an engaging projection is formed in a bottom constituting a bottom plate of the bottom supporting flat portion, and the moving plate is engaged with the engaging projection of the bottom in a locked state by the locking means.

In such a construction, even if an attempt to remove the bottom from the upper case portion is made, the engaging projection of the bottom is caught by the moving plate, whereby the bottom cannot be removed. That is, it is impossible to force unlocking to be achieved by removing the bottom in the attachment device and operating the moving plate.

An attachment device of a portable electronic equipment according to the present invention is characterized by comprising a bottom supporting flat portion on which the portable electronic equipment is mounted, and a port replicator portion provided in a rear end of the bottom supporting flat portion and having a terminal portion to which a terminal portion provided on the back surface of the portable electronic equipment is removably connected.

Since the attachment device has the bottom supporting flat portion, therefore, a guide for introducing the portable electronic equipment into the port replicator portion, a member for grounding the portable electronic equipment, a member for engaging the portable electronic equipment, means for engaging the attachment device of the portable electronic equipment with the feature expanding unit of the portable electronic equipment (for example, an engaging hole), and a finger catching portion for facilitating an operation performed when the attachment device of the portable electronic equipment is removed from the feature expanding unit of the portable electronic equipment, for example, can be formed and arranged in the bottom supporting flat portion. Even when only the attachment device of the portable electronic equipment is obtained, a function as the port replicator is obtained.

Furthermore, a feature expanding unit of a portable electronic equipment according to the present invention is characterized in that it contains one or more feature expanding means of the portable electronic equipment, has its upper end surface on which the bottom supporting flat portion in the attachment device of the portable electronic equipment is mounted, and has a terminal portion to which a terminal portion of the port replicator portion in the attachment device of the portable electronic equipment is removably connected.

The bottom supporting flat portion in the attachment device of the portable electronic equipment is thus mounted on the upper end surface of the unit. Even if a feature expanding unit of the portable electronic equipment is newly obtained after the attachment device of the portable electronic equipment is obtained, the feature can be gradually expanded without making the attachment device of the portable electronic equipment useless.

A separation type feature expanding device of a portable electronic equipment according to the present invention is characterized in that an attachment device of the portable electronic equipment and a feature expanding unit of the portable electronic equipment are separably provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view showing a state where a separation type feature expanding device of the portable electronic equipment according to the present invention and an ISA card case mounted thereon are locked by connecting and locking means;

FIG. 7A is a diagram showing a locked state by locking means in the present invention, FIG. 7B is a diagram showing an unlocked state, and FIG. 7C is a diagram showing an ejected state;

FIG. 18A is a partially enlarged view of the feature expanding unit of the portable electronic equipment, which illustrates a shutter device in the present invention, and FIG. 18B is a side view thereof;

FIG. 20 is a perspective view showing a state where a locking member is projected in FIG. 13;

DESCRIPTION OF THE PREFERRED EMBODIMENTS

Description is now made of embodiments of the present invention on the basis of the drawings.

Figure 1:
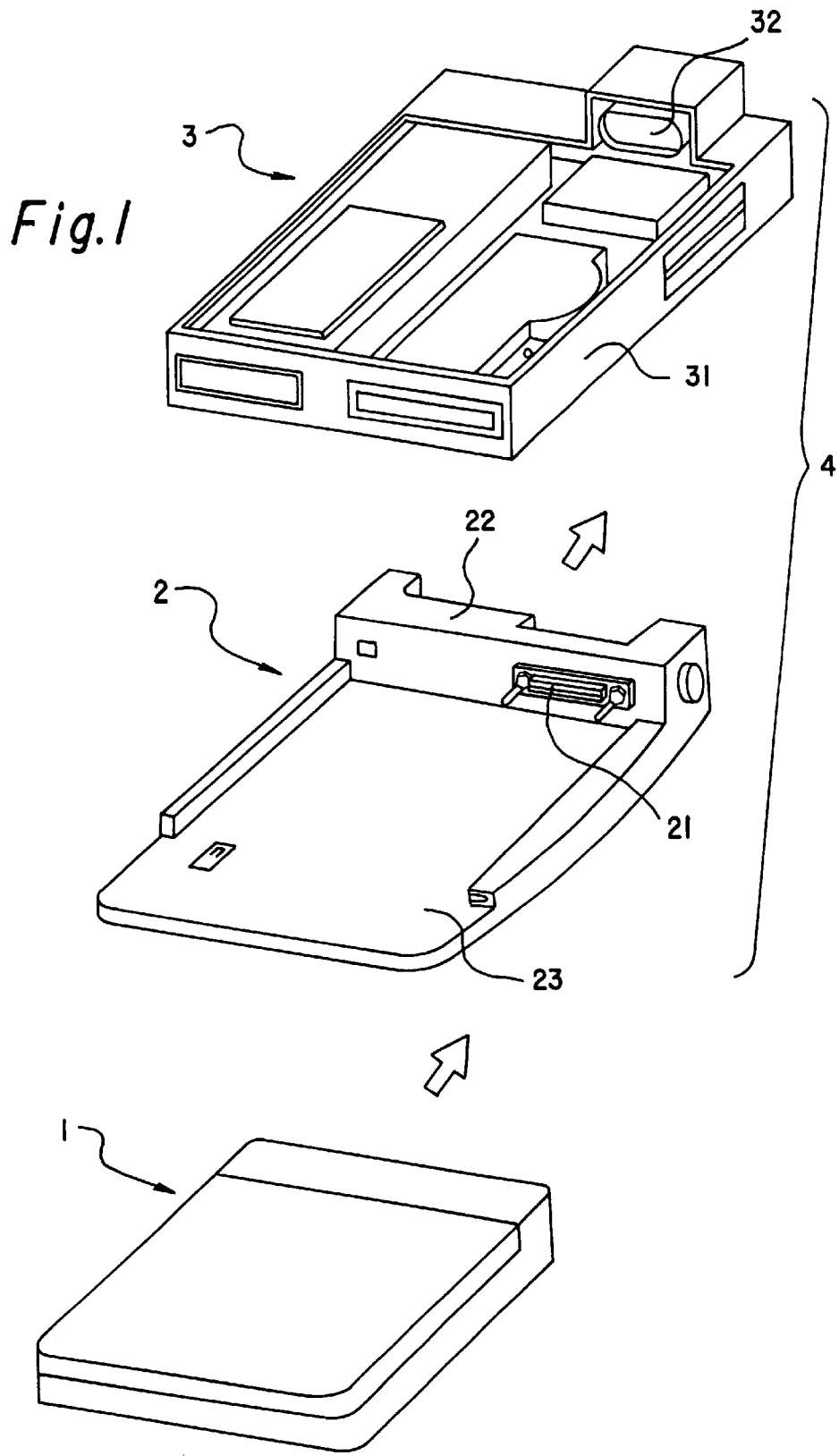
FIG. 1 is a perspective view illustrating an attachment device of a portable electronic equipment and a feature expanding unit of the portable electronic equipment according to the present invention, and a notebook personal computer.

A perspective view of FIG. 1 illustrates a notebook type personal computer 1 serving as portable electronic equipment, an attachment device of the portable electronic equipment 2, and a feature expanding unit of the portable electronic equipment 3. The attachment device of the portable electronic equipment 2 and the feature expanding unit of the portable electronic equipment 3 constitute a separation type feature expanding device 4 of the portable electronic equipment. That is, the separation type feature expanding device 4 of the portable electronic equipment is so constructed that it can be separated into the attachment device of the portable electronic equipment 2 and the feature expanding unit of the portable electronic equipment The attachment device of the portable electronic equipment (hereinafter merely referred to as the attachment device) 2 comprises a bottom supporting flat portion 23 on which the notebook type personal computer (hereinafter merely referred to as the note PC) 1 is mounted and a port replicator portion 22 provided in the rear of the bottom supporting flat portion 23. A terminal portion 21 to which a terminal portion (not shown) provided on the back surface of the note PC 1 is removably connected is provided on the front surface of the port replicator portion 22. Further, a terminal portion to which a cable for connecting a printer or the like is connected, is provided on the back surface of the port replicator portion 22.

Figure 2A:
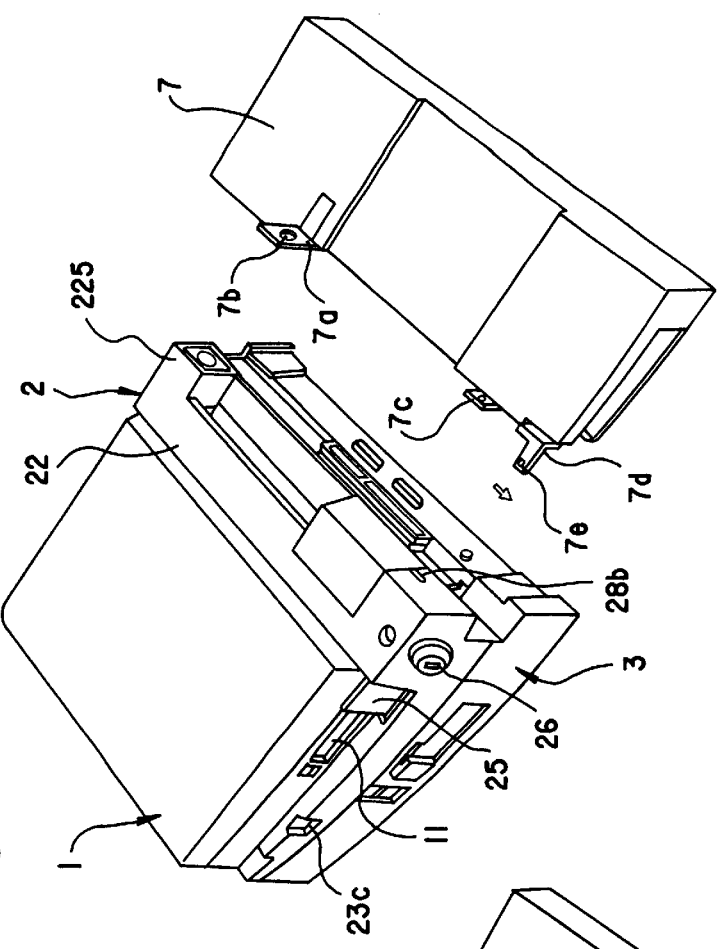
FIG. 2A is a perspective view showing a state where the attachment device of the portable electronic equipment according to the present invention is arranged on the feature expanding unit of the portable electronic equipment, and the notebook personal computer is arranged on the attachment device of the portable electronic equipment.
Figure 2B:
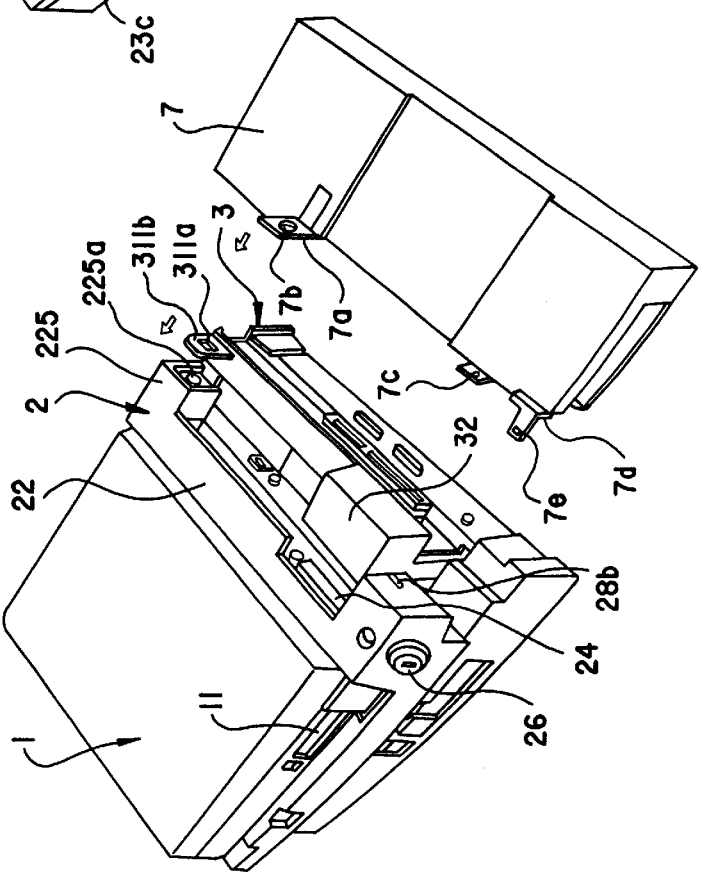
FIG. 2B is a perspective view showing a state where the attachment device of the portable electronic equipment is slightly shifted in the direction of removal.

In the feature expanding unit of the portable electronic equipment (hereinafter merely referred to as the feature expanding unit) 3, one or more feature expanding means of the note PC 1 (for example, a hard disk driver, an optical disk driver, or a data reading portion of a PCMCIA (Personal Computer Memory Card International Association) card) is contained in a box 31 whose upper end surface is opened. The bottom supporting flat portion 23 of the attachment device 2 is mounted on the upper end surface of the box 31. A terminal portion 32 to which a terminal portion 24 (see FIG. 2B) formed on the back surface of the port replicator portion 22 in the attachment device 2 is removably connected is aprovided on the front surface of a vertically rising portion provided at a rear end of the box 31. A perspective view of FIG. 2A shows a state where the note PC 1, the attachment device 2, and the feature expanding unit 3 are combined to one another. That is, the note PC 1 can be carried on the bottom supporting flat portion 23 of the attachment device 2, and the attachment device 2 can be further carried on the feature expanding unit 3. A perspective view of FIG. 2B shows a state where the attachment device 2 is slightly slid in the direction of removal. When the attachment device 2 is mounted on the feature expanding unit 3, the attachment device 2 may be pushed backward in the state shown in FIG. 2B.

A perspective view of FIG. 3 shows a state where the attachment device 2 is carried on the feature expanding unit 3, and an ISA card case 7 which is an electronic substrate carrying case is further mounted on the expanding unit 3, they are connected and locked by connecting and locking means 5. A connecting rope 51 is connected to the connecting and locking means 5, and the connecting rope 51 is connected to a rack for a personal computer which is a non-portable member, for example, so that the attachment device 2, the feature expanding unit 3, and the ISA card case 7 can be prevented from being stolen. Examples of the connecting and locking means 5 include one called "kensington lock".

As can be seen from FIG. 2B, a square-shaped rising portion (a plate-shaped member) 311b, having a first locking hole 311a in the shape of a long hole into which a locking and engaging member 5a of the connecting and locking means 5 (see FIGS. 36A and FIG. 36B) is inserted, is formed at a left rear end of the feature expanding unit. Further, a square-shaped rising portion 7a having a third locking hole 7b in an approximately circular shape into which the locking and engaging member 5a of the connecting and locking means 5 is inserted is also formed at the front of the ISA card case 7.

Figure 35:
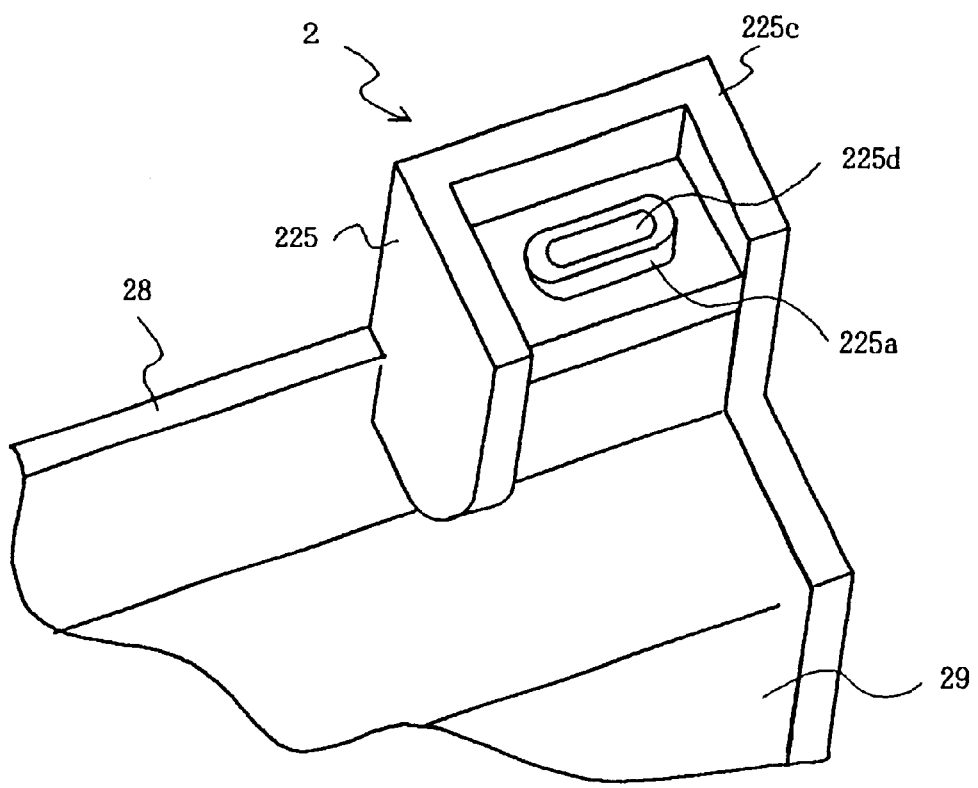
FIG. 35 is a perspective view showing a connecting and locking portion in the attachment device of the portable electronic equipment according to the present invention.

As illustrated in an enlarged manner in a perspective view of FIG. 35, a locking portion 225 is formed at a left rear end of the attachment device 2. The locking portion 225 has the shape of an approximately square hollow box. Both side surfaces, the upper surface and the back surface of the approximately square hollow box are formed of a resin cover 28 constituting a case of the attachment device 2, and the bottom surface thereof is formed of a bottom 29 constituting a bottom plate of the attachment device 2. An elliptical projection 225a of size in which the first locking hole 311 a can be fitted is formed on the back surface of the locking portion 225, and a second locking hole 225b in the shape of a long hole into which the locking and engaging member 5a of the connecting and locking means 5 is inserted is formed in the elliptical projection 225a. Further, a frame portion 255c surrounding the rising portion 31 1b and the rising portion 7a is formed in the periphery of the back surface of the locking portion 225.

Figure 36A:
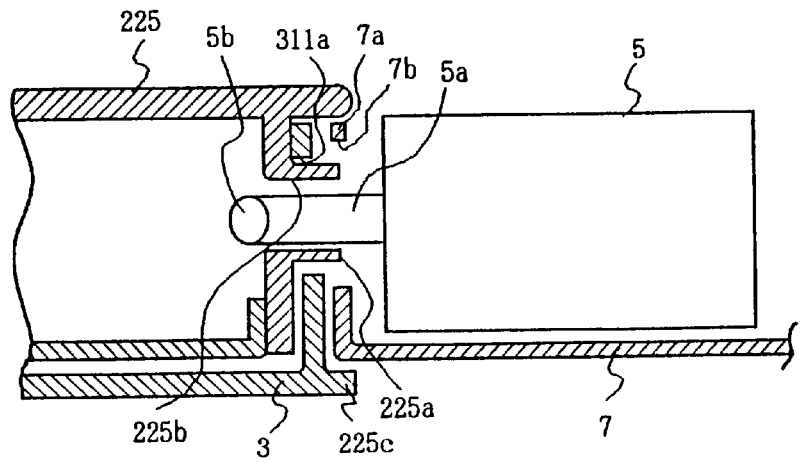
FIGS. 36A and 36B are longitudinal sectional views showing a state where the attachment device of the portable electronic equipment, the feature expanding unit of the portable electronic equipment, and an ISA card case are connected and locked by connecting and locking means in the present invention.
Figure 36B:
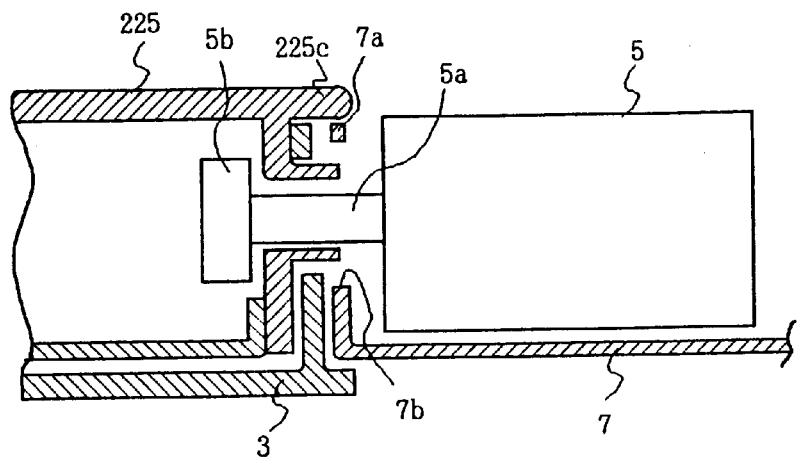
Figure 37:
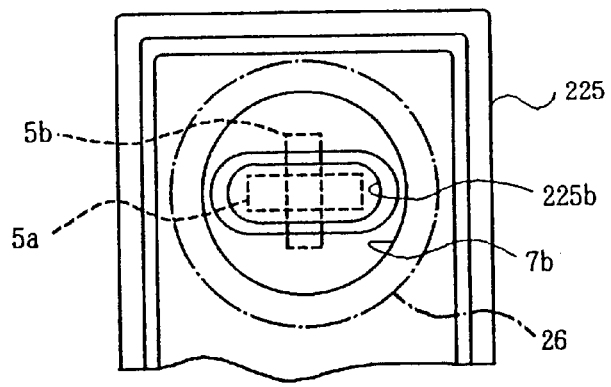
FIG. 37 is a front view showing the state of a rotating portion in a locked state by connecting and locking means in the present invention.

FIGS. 36A and 36B are longitudinal sectional views showing a state where the locking and engaging member 5a of the connecting and locking means 5 passes through a third locking hole 7b of the ISA card case 7, a locking hole 311a of the expanding unit 3, and the second locking hole 225b of the attachment device 2, and a rotating portion 5b of the locking and engaging member 5a enters the locking portion 225. FIGS. 36A and 36B respectively illustrate an unlocked state and a locked state. FIG. 37 is a front view showing a state where the rotating portion 5b and the locking and engaging member 5a in the locked state have a cross shape.

As can be seen from FIGS. 36A, 36B and 37, the rotating portion 5b of the locking and engaging member 5a is rotated through 90°, so that the rotating portion 5b crosses the locking and engaging member 5a in a cross shape, to achieve locking. The locking prevents the attachment device 2, the feature expanding unit 3, and the ISA card case 7 from being stolen.

Furthermore, as shown in FIGS. 2A and 2B, an engaging projection 7d is formed at a right front end of the ISA card case 7, and an engaging hole 7e is formed in the engaging projection 7d. The engaging projection 7d can be inserted into an insertion hole 28b formed on the back surface of the port replicator portion 22 and in the vicinity of the position where locking means 26 as described later is arranged. Further, a grounding projection 7c is formed at the front in the center of the ISA card case 7, and is screwed into the terminal portion 32 in the direction of removal so that connection to the ground is made.

(Attachment Device)

Figure 4:
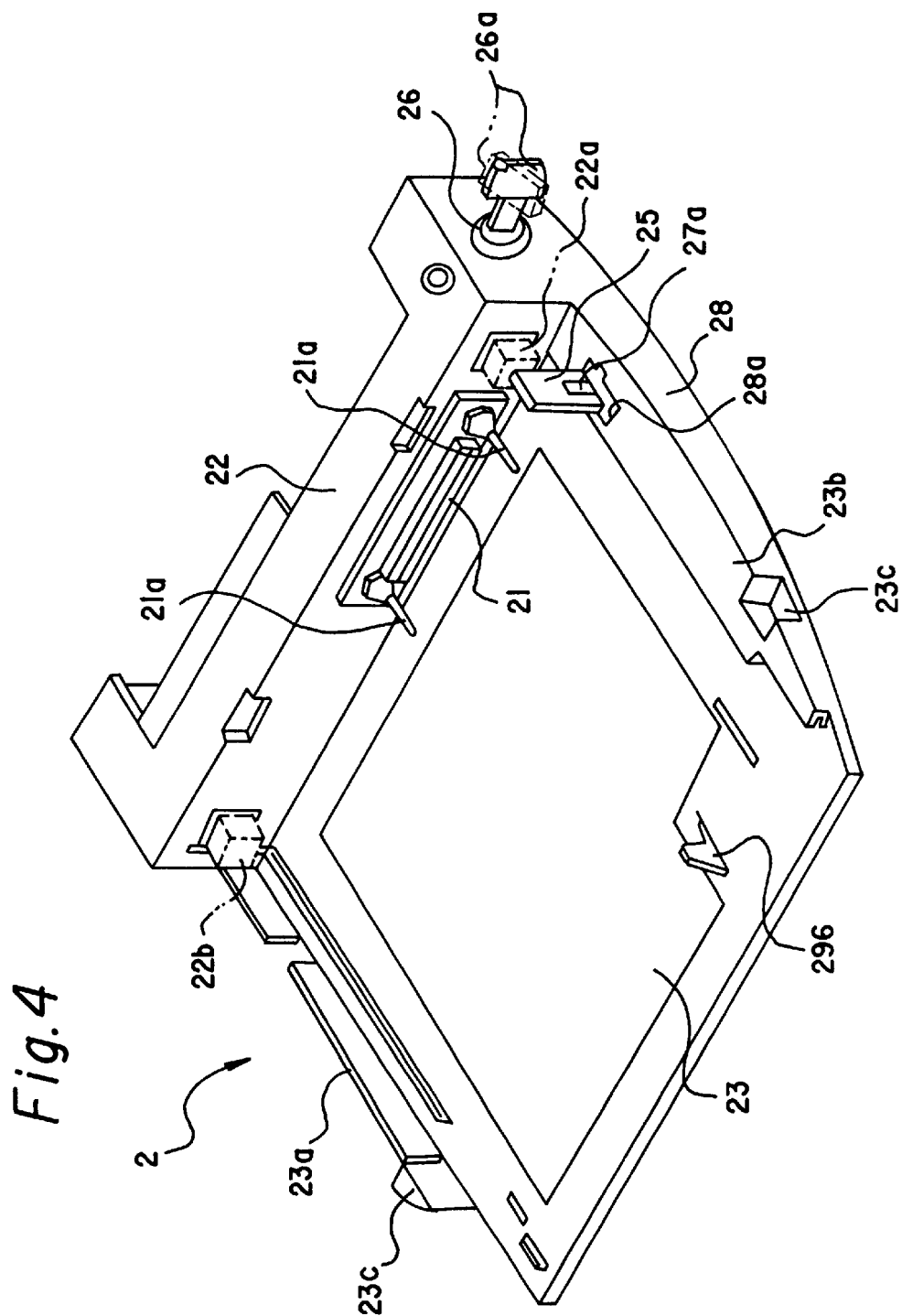
FIG. 4 is a perspective view showing in an enlarged manner the attachment device of the portable electronic equipment according to the present invention.

A perspective view of FIG. 4 illustrates the attachment device 2 in an enlarged manner. Guide portions 23a and 23b are formed of the resin cover 28 constituting the case of the attachment device 2 on both right and left sides of the bottom supporting flat portion 23. Guiding in a case where the note PC 1 is mounted on the bottom supporting flat portion 23, and the terminal portion formed on the back surface thereof is fitted in the terminal portion 21 of the port replicator portion 22 and movement in the lateral direction of the note PC 1 after the fitting can be regulated by guide surfaces of the guide portions 23a and 23b. Further, the guide portions 23a and 23b are respectively provided with finger catching portions 23c for making easy an operation performed when the attachment device 2 is removed from the expanding unit 3 and an operation performed when the note PC 1 is mounted on the attachment device 2.

A card shutter 25 is provided on the upper surface of the right guide portion 23b. The card shutter 25 is provided in a position corresponding to a PCMCIA card loading aperture (see FIG. 2) 11 provided on a side surface of the note PC 1 set on the bottom supporting flat portion 23. The card shutter 25 is driven back and forth by a rotating operation of the locking means 26 as described later, and is moved to such a position as to cover a part of the PCMCIA card loading aperture 11 in the locking position of the locking means 26, while being moved to such a position as to retreat from the PCMCIA card loading aperture 11 in the unlocking position thereof. A driving mechanism of the locking means 26 and the card shutter 25 will be described in detail later.

Furthermore, a grounding member 296 is so provided that it can be retracted into the resin cover 28 and is projected therefrom in the bottom supporting flat portion 23. The grounding member 296 can ground the note PC 1, and can engage the note PC 1. The details of the grounding member 296 will be described later. Further, an engaging hole 29e (see FIG. 16) into which a hook-shaped projection 33a (see FIG. 13) projected from an upper end surface of the box 31 in the feature expanding unit 3 is inserted, and a long hole 29f (see FIG. 16) into which a bending rising portion 37a (see FIG. 13) as described later is inserted are formed on the lower surface of the bottom supporting flat portion 23.

The above-mentioned terminal portion 24 fitted in the terminal portion 32 of the feature expanding unit 3 as shown in FIG. 2B, and a group of terminals connected to equipments such as a printer and a scanner (not shown) by cables are provided on the back surface of the port replicator portion 22.

As shown in FIG. 4, the above-mentioned terminal portion 21 is provided on the front surface of the port replicator portion 22, and the terminal portion of the note PC 1 is fitted in the terminal portion 21. Guide pins 21a are provided in the terminal portion 21 in order that the fitting is properly performed, and guide holes (not shown) are provided on the back surface of the note PC 1 in correspondence thereto. Further, pressing projections 22a and 22b for removing the note PC 1 set on the bottom supporting flat portion 23 are so provided that they can be projected and retracted in positions in the vicinity of both ends on the front surface of the port replicator portion 22. The pressing projections 22a and 22b are projected and retracted upon receipt of a driving force by a rotating operation of the locking means 26. The specific construction therefor will be described later.

(Locking Means)

The locking means 26 is provided as shown in FIG. 4 on a side surface of the port replicator portion 22. A key 26a is inserted into the locking means 26 and is rotated, so that a locked state and an unlocked state by the locking means 26 can be brought about. When the locking means 26 is further operated beyond the unlocked state in the direction of an operation performed when the locked state by the locking means 26 is changed into the unlocked state, the pressing projections 22a and 22b can be projected (the projected state is hereinafter referred to as an ejected state).

Figure 5:
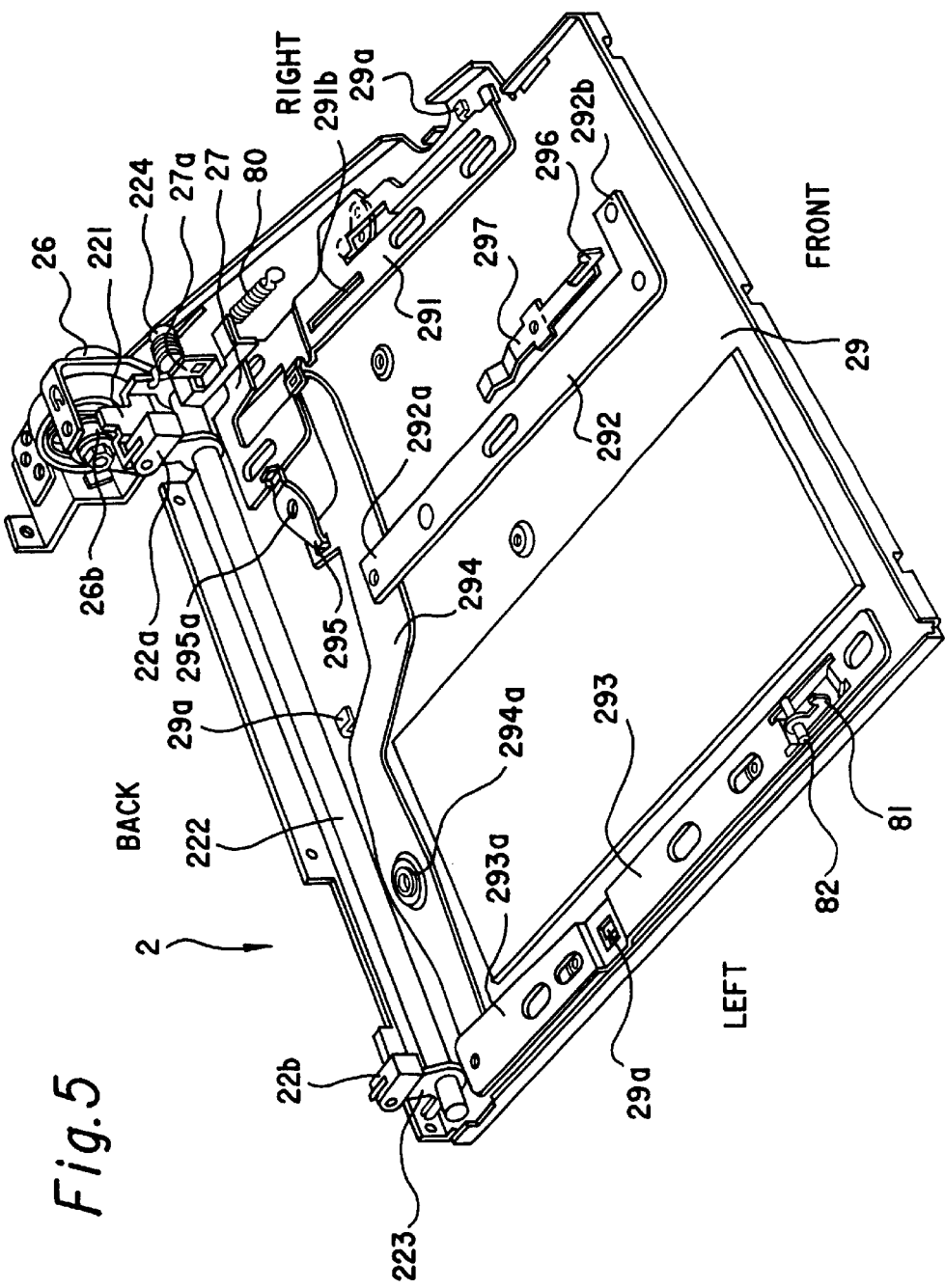
FIG. 5 is a perspective view showing a state at the time of unlocking where a resin cover and a port replicator portion are removed in the attachment device of the portable electronic equipment shown in FIG. 4.
Figure 6:
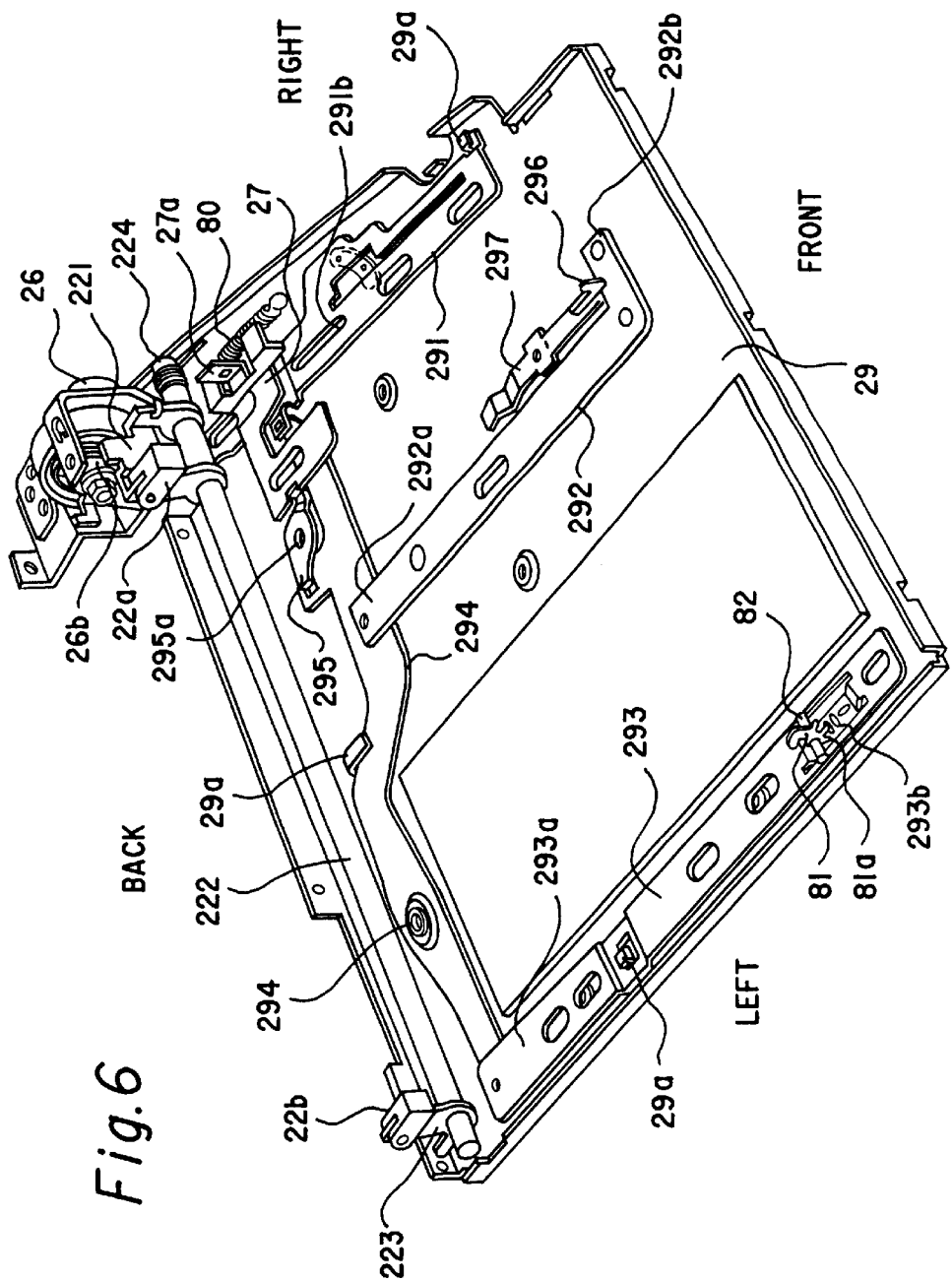
FIG. 6 is a perspective view showing a state at the time of locking where the resin cover and the port replicator portion are removed in the attachment device of the portable electronic equipment shown in FIG. 4.

FIGS. 5 and 6 are perspective views showing a state where the resin cover 28 and a member constituting the port replicator portion 22 in the attachment device 2 are removed, to expose a bottom 29 formed of an iron plate, where FIG. 5 shows the unlocked state by the locking means 26, and FIG. 6 shows the locked state by the locking means.

FIGS. 7A, 7B, and 7C are side views showing the locking means 26 and a mechanism portion in its periphery, where FIG. 7A shows the locked state by the locking means 26, FIG. 7B shows the unlocked state, and FIG. 7C shows the ejected state. The locking means 26 is provided with a rotating portion 26b rotated by a rotating operation of the key 26a. An operating projection 26c (which is not seen in FIGS. 5 and 6 because it is positioned on the back surface of an operating plate 221) is provided in the rotating portion 26b. The operating projection 26c presses the operating plate 221 in the ejected state. When the operating plate 221 is inclined upon being pressed by the operating projection 26c as shown in FIG. 7C, the pressing projection 22a connected to the operating plate 221 is moved in the direction of projection, and is projected from the resin cover 28 constituting the port replicator portion 22. A rotating shaft 222 is fastened to the operating plate 221, and the rotating shaft 222 is rotated by the inclination of the operating plate 221. An operating plate 223 (see FIGS. 5 and 6) is fastened to the other end of the rotating shaft 222, and the operating plate 223 is inclined by the rotation of the rotating shaft 222. The pressing projection 22b is connected to the operating plate 223, and the pressing projection 22b is moved in the direction of projection by the inclination of the operating plate 223, and is projected from the resin cover 28 constituting the port replicator portion 22.

As shown in FIGS. 5 and 6, a coil spring 224 is externally fitted in an end of the rotating shaft 222. One end of the coil spring 224 is engaged with the operating portion 221, and the operating portion 221 is urged in the direction in which the pressing projections 22a and 22b are retracted into the resin cover 28 constituting the port replicator portion 22 by the coil spring 224. Consequently, the pressing projections 22a and 22b are projected, as shown in FIG. 7C, upon being operated by the key 26a, after which a user lets go his or her hold on the key 26a, the pressing projections 22a and 22b are retracted into the resin cover 28 constituting the port replicator portion 22 and the operating projection 26c is also returned to the unlocking position, as shown in FIG. 7B, by an urging force of the coil spring 224 and a spring (not shown) contained in the locking means 26.

Figure 9:
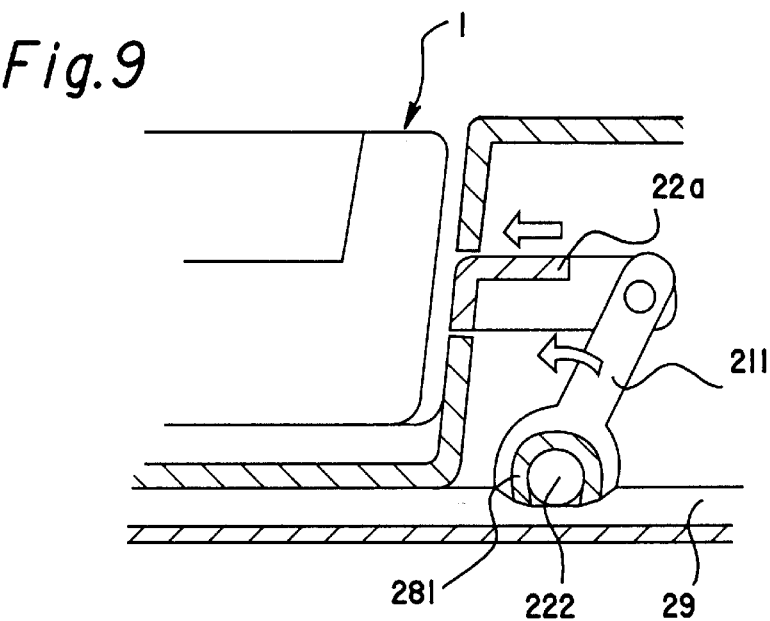
FIG. 9 is a longitudinal sectional view showing a structure in which an eject shaft, a pressing projection, and the like are arranged and connected in the present invention.
Figure 10:
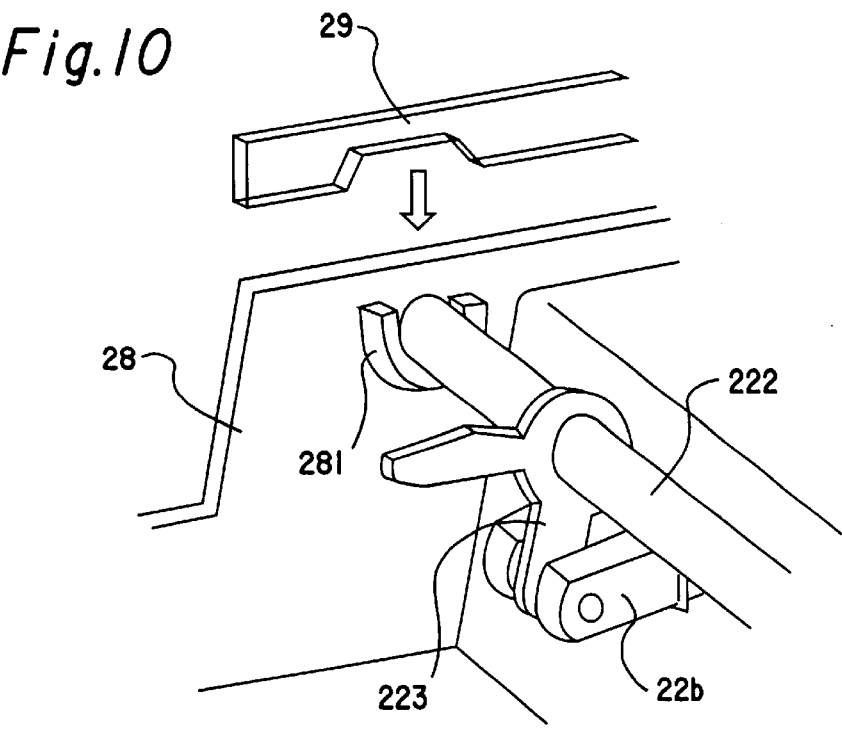
FIG. 10 is a perspective view as seen being put its bottom surface up, showing a structure in which an eject shaft, a pressing projection, and the like are arranged and connected in the present invention.

As shown in a side view of FIG. 9 and a perspective view of FIG. 10, the rotating shaft 222 is supported by a bearing portion 281 in an approximately U shape. The bearing portion 281 is constructed by being integrally molded by resin inside of the resin cover 28. The bearing portion 281 is formed with an opening of the U shape directed downward, and the opening of the U shape is closed by the bottom 29.

Figure 8A:
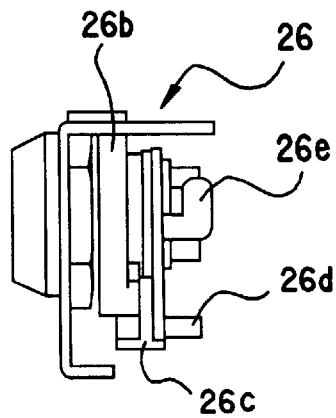
FIG. 8A is a rear view showing a locked state of a locking structure of an ISA card case by the locking means in the present invention.
Figure 8B:
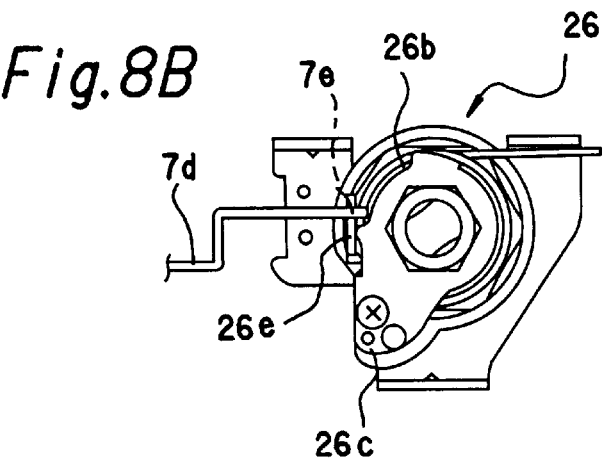
FIG. 8B is a left side view showing the locked state.
Figure 8C:
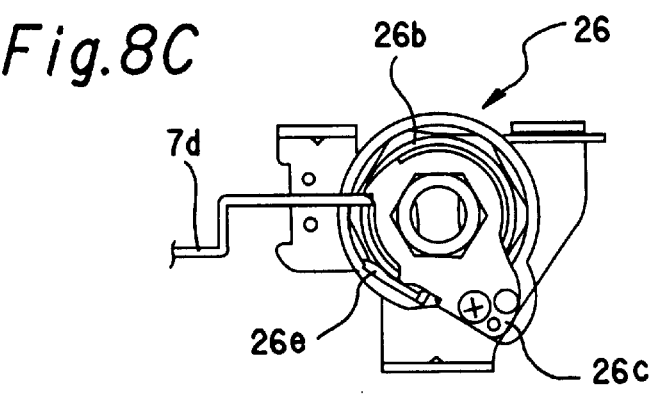
FIG. 8C is a right side view showing an unlocked state.

FIGS. 8A, 8B, and 8C are diagrams showing the locking means 26 and the mechanism portion in its periphery, where FIG. 8B corresponds to FIG. 7A as viewed from the back surface, and FIG. 8C corresponds to FIG. 7B as viewed from the back surface. An engaging member 26e is formed in the rotating portion 26b of the locking means 26. At the time of locking by the locking means 26, the engaging member 26e is engaged with the engaging hole 7e of the engaging projection 7d of the ISA card case 7 inserted into the insertion hole 28b (see FIG. 2) of the resin cover 28 so that the ISA card case 7 cannot be removed.

As shown in FIGS. 5 and 6, a first back-and-forth sliding plate 291 provided so as to slide back and forth, a second back-and-forth sliding plate 292 provided so as to slide back and forth, a third back-and-forth sliding plate 293 provided so as to slide back and forth, a first rotating plate 294 rotatably supported by a shaft 294a, a second rotating plate 295 rotatably supported by a shaft 295a, a supporting plate 297 elastically supporting the grounding member 296, and a card shutter driving portion 27 are arranged on the bottom 29. Operations performed by the first back-and-forth sliding plate 291 and the like will be simply described. When a locking operation is performed by the locking means 26, the first back-and-forth sliding plate 291 and the second back-and-forth sliding plate 292 retreat, while the third back-and-forth sliding plate 293 and the card shutter driving portion 27 advance.

Support for sliding or rotation of the first back-andforth sliding plate 291 and the like is provided by a projection or the like formed in the resin cover 28 covering the bottom 29. Further, the first back-and-forth sliding plate 291 or the like is prevented from being removed from the resin cover 28 in an umbrella portion of a screw (not shown) screwed in the projection. In the locked state (see FIG. 6) by the locking means 26, the first back-and-forth sliding plate 291, the third back-and-forth sliding plate 293, and the first rotating plate 294 are respectively positioned under engaging projections 29a formed in the bottom 29. In such a state, even if an attempt to remove the bottom 29 from the resin cover 28 is made, the engaging projections 29a in the bottom 29 are caught by the first back-and-forth sliding plate 291 or the like, whereby the bottom 29 cannot be removed. That is, it is impossible to force unlocking to be performed by removing the bottom 29 in the attachment device 2 and operating the first back-and-forth sliding plate 291 or the like.

(First Back-and-Forth Sliding Plate)

Figure 11:
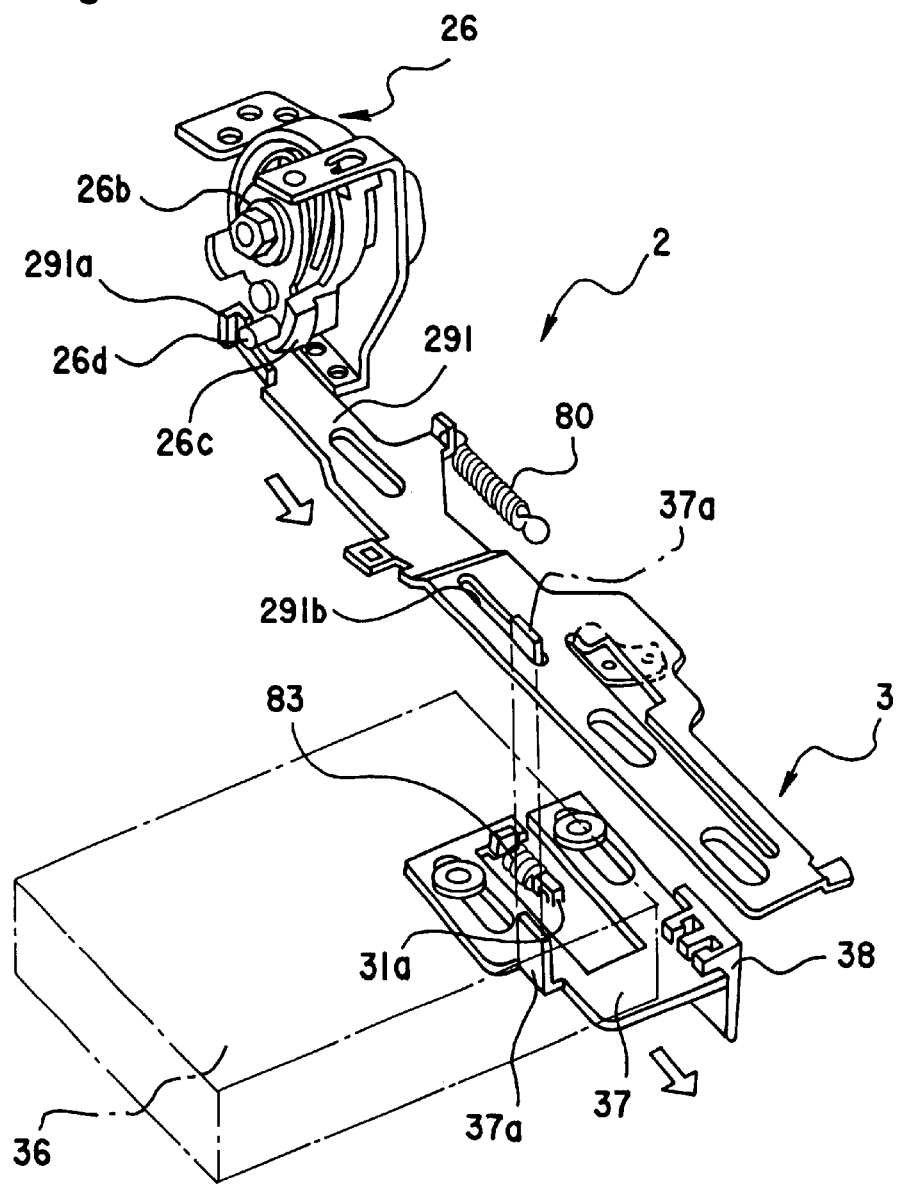
FIG. 11 is a perspective view showing the relationship between locking means and a first back-and-forth sliding plate (a state at the time of unlocking) in the present invention.
Figure 12:
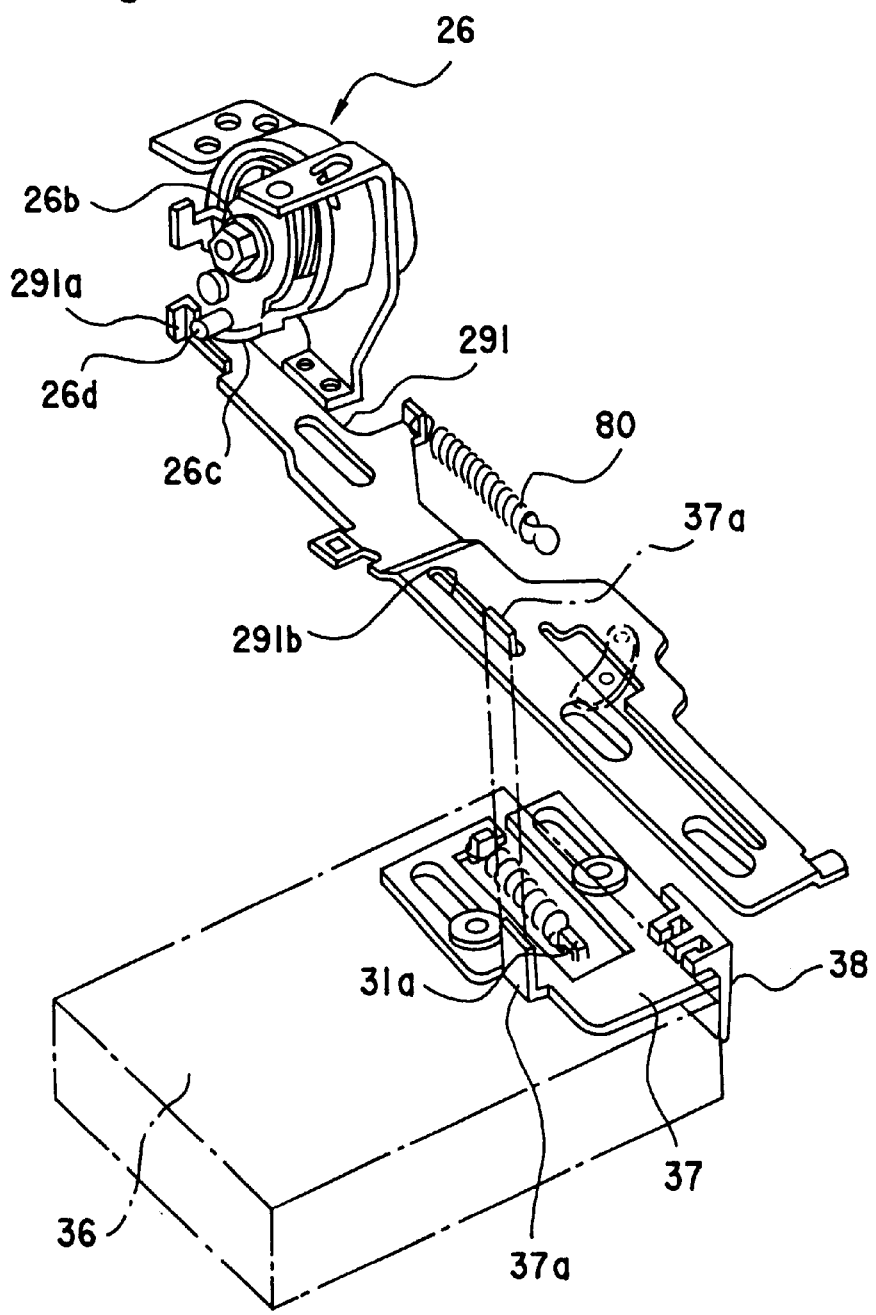
FIG. 12 is a perspective view showing the relationship between locking means and a first back-and-forth sliding plate (a state at the time of locking) in the present invention.

As shown in FIG. 11 which is a perspective view showing the unlocked state of the first back-and-forth sliding plate 291 and FIG. 12 which is a perspective view showing the locked state, a bending portion 291a is formed at a rear end of the first back-and-forth sliding plate 291. The bending portion 29 la is engaged with a pin 26d projected in the lateral direction from the operating projection 26c in the rotating portion 26b of the locking means 26. When the rotating portion 26b of the locking means 26 is rotated in the direction of locking, the pin 26d presses the bending portion 291a backward, whereby the first back-and-forth sliding plate 291 slides backward. On the other hand, when the rotating portion 26b of the locking means 26 is rotated in the direction of unlocking, the pin 26d attempts to be separated from the bending portion 29 la. However, the first back-and-forth sliding plate 291 slides forward because it is urged in the direction of forward movement by a coil spring 80. One end of the coil spring 80 is engaged with a supporting portion (not shown) formed in the resin cover 28.

(First Rotating Plate)

As shown in FIGS. 5 and 6, the first rotating plate 294 extends in the lateral direction, and has its right end connected to the first back-and-forth sliding plate 291. Consequently, the first rotating plate 294 is rotated around the shaft 294a upon receipt of a driving force by back-and-forth sliding of the first back-and-forth sliding plate 291.

(Second Back-and-Forth Sliding Plate)

Figure 24A:
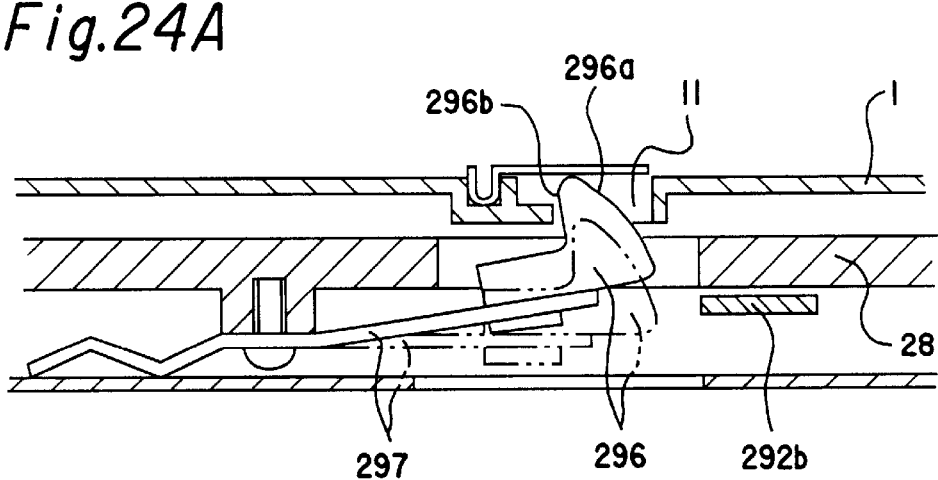
FIG. 24A is a longitudinal sectional view showing how a state where a notebook personal computer is engaged by a grounding member in the present invention can be released by a second back-and-forth sliding plate (an unlocked state)
Figure 24B:
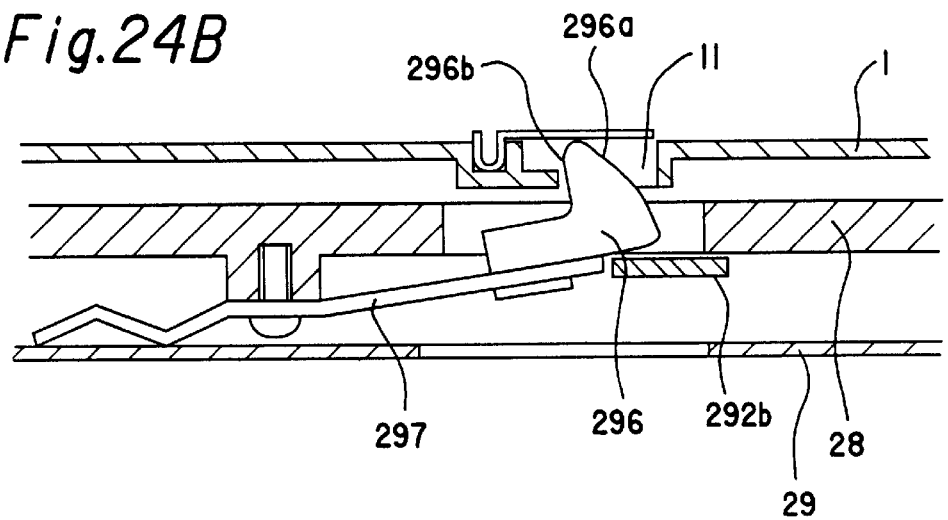
FIG. 24B is a longitudinal sectional view showing how it is inhibited from being released (a locked state)

A rear end 292a of the second back-and-forth sliding plate 292 is connected to the first rotating plate 294 in an approximately intermediate position between the right end of the first rotating plate 294 and the shaft 294a. Consequently, the second back-and-forth sliding plate 292 slides back and forth upon receipt of a driving force by a rotating operation of the first rotating plate 294. The grounding member 296 is prevented from being retracted into the resin case 28 upon positioning an L-shaped front end 292b below the grounding member 296 as also shown in FIG. 24B when the second back-and-forth sliding plate 292 slides backward (in the locked state), while being allowed to be retracted into the resin case 28 upon positioning the L-shaped front end 292b in a position spaced apart from a portion just below the grounding member 296 as also shown in FIG. 24A when it slides forward (in the unlocked state) (see an imaginary line in FIG. 24A). In a state where the grounding member 296 is prevented from being retracted into the resin case 28, if an attempt to remove the note PC 1 is made, a state where the grounding member 296 is engaged with an engaging ground hole (not shown) formed on the bottom surface of the note PC 1 cannot be released, whereby the note PC 1 is prevented from being removed.

(Grounding Member)

The supporting plate 297 for supporting the grounding member 296 is composed of a metal plate spring. A front end, to which the grounding member 296 is fastened, of the supporting plate 297 is raised upward by an elastic force, so that the grounding member 296 can be projected from the upper surface of the resin case 28 in the bottom supporting flat portion 23. The supporting plate 297 is screwed into the resin case 28 in its approximately central part, is raised upward at its front end, and is brought into contact with the bottom 29 at its rear end.

Figure 25A:
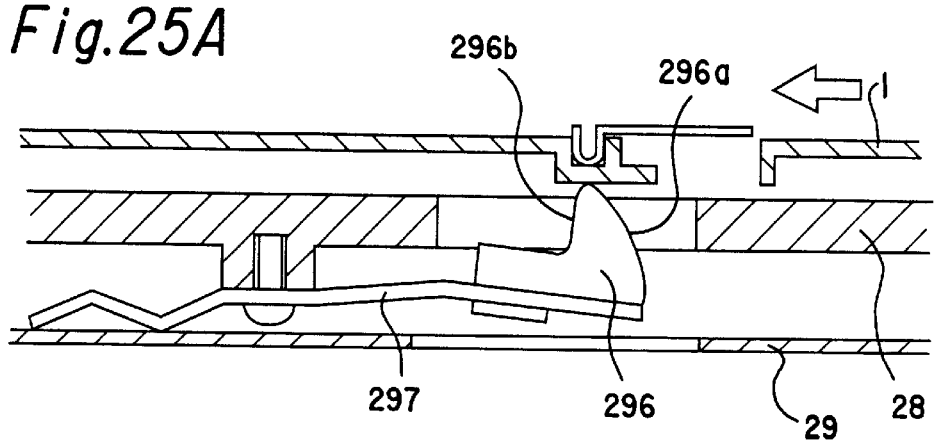
FIGS. 25A, 25B, and 25C are longitudinal sectional views showing how a grounding member is projected and retracted in a case where a notebook personal computer is set or ejected on or from a bottom supporting flat portion in the attachment device according to the present invention.
Figure 25B:
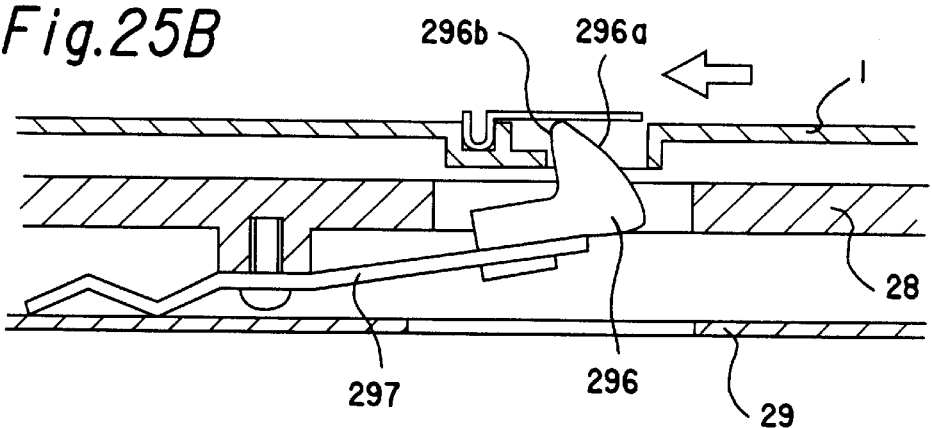
Figure 25C:
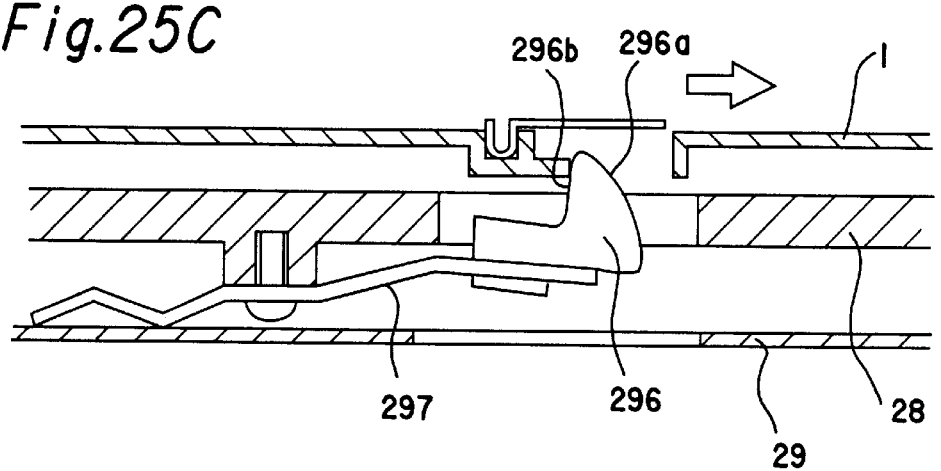

The grounding member 296 has a tapered surface 296a for smoothly mounting and removing the note PC 1. Further, a fixed point of the supporting plate 297 (the abovementioned screwed point) is set in a position spaced apart leftward in the drawing from a position below the grounding member 296 so that the supporting plate 297 smoothly swings up and down by a horizontal force against the grounding member 296. When the note PC 1 is set as shown in FIG. 25A, therefore, the supporting plate 297 smoothly swings downward by the function of the tapered surface 296a of the grounding member 296. Thereafter, the grounding member 296 is engaged with the engaging ground hole 11 of the note PC 1, as shown in FIG. 25B. On the other hand, an engaging surface 296b of the grounding member 296 becomes a vertically rising surface for engaging the note PC 1, as shown in FIG. 24B. In a state where there is no regulation by the L-shaped front end 292b, however, the supporting plate 297 slightly bends so that the degree to which the engaging surface 296b is vertical becomes low, as shown in FIG. 25C. At the time of an operation for removing the note PC 1, the supporting plate 297 is moved up and down by a horizontal force against the grounding member 296.

(Third Back-and-Forth Sliding Plate)

As shown in FIGS. 5 and 6, a rear end 293a of the third back-and-forth sliding plate 293 is connected to a left end of the first rotating plate 294. Consequently, the third back-and-forth sliding plate 293 slides back and forth upon receipt of a driving force by a rotating operation of the first rotating plate 294. A rack hole 293b (see FIG. 6) having a rack formed on its surface is formed in the third back-and-forth sliding plate 293. In a position corresponding to the position where the rack hole 293b is formed, a horizontal shaft 82 is rotatably supported on the resin cover 28, and a rotation engaging claw 81 is fastened to the horizontal shaft 82. A gear portion 81a is formed in the rotation engaging claw 81, and is engaged with the rack hole 293b.

Figure 26:
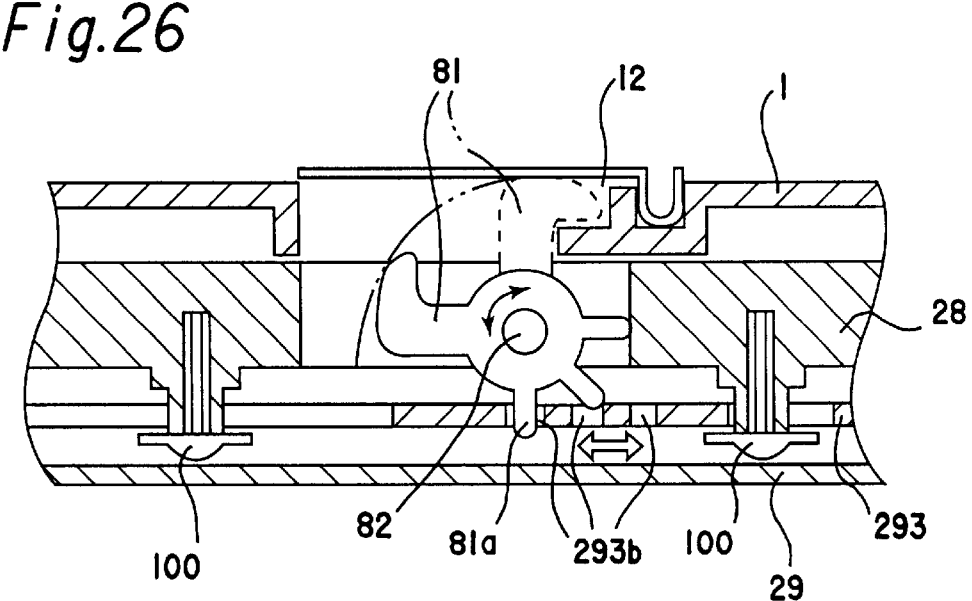
FIG. 26 is a longitudinal sectional view in an unlocked state showing how a gear portion of a rotation engaging claw and a rack hole of a third back-and-forth sliding plate are engaged with each other in the present invention.
Figure 27:
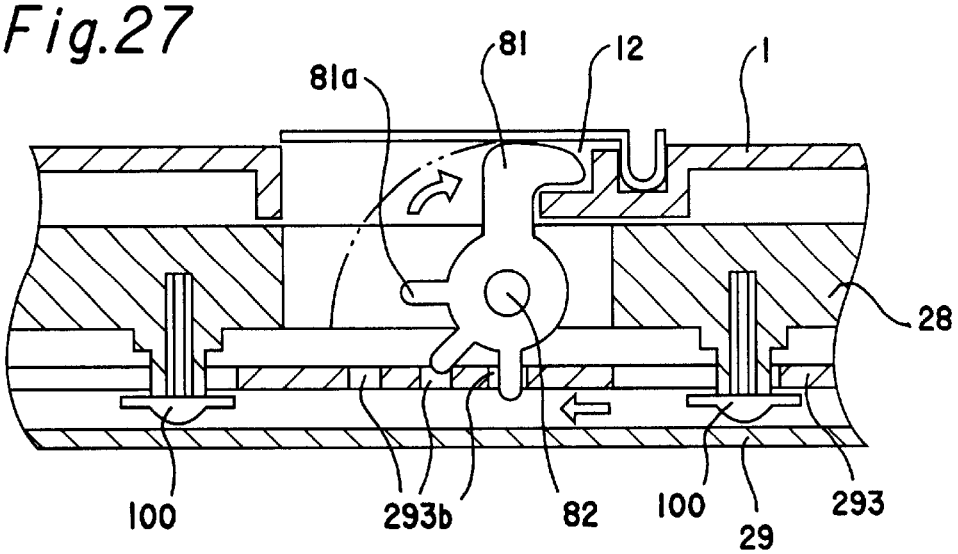
FIG. 27 is a longitudinal sectional view in a locked state showing how a gear portion of a rotation engaging claw and a rack hole of a third back-and-forth sliding plate are engaged with each other in the present invention.
Figure 28A:
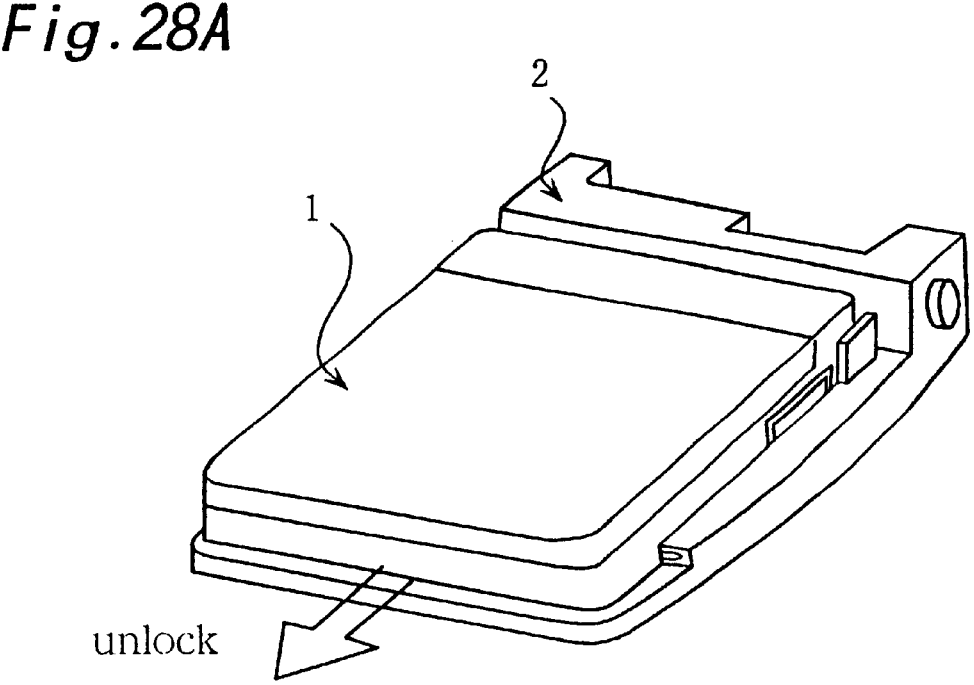
FIG. 28A is a perspective view showing a state where a notebook personal computer is set on the attachment device according to the present invention.
Figure 28B:
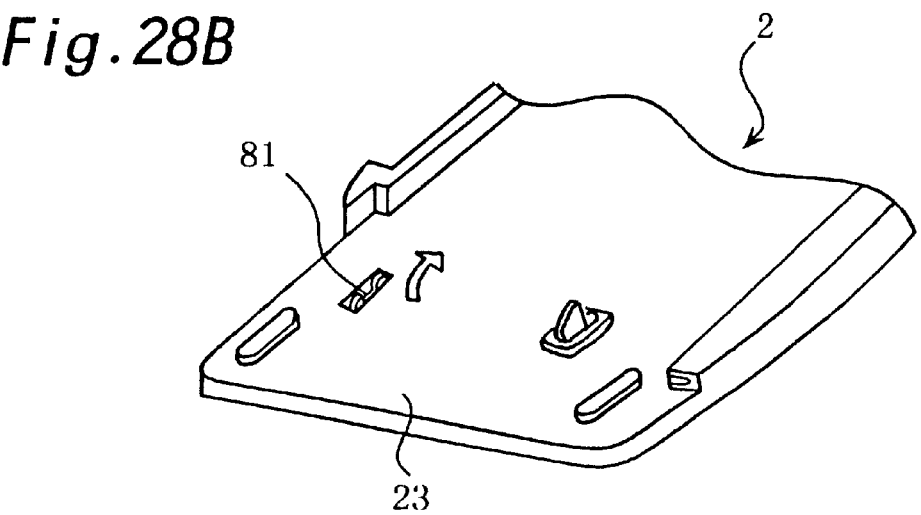
FIG. 28B is a perspective view showing a state where a rotation engaging claw is unlocked.
Figure 29A:
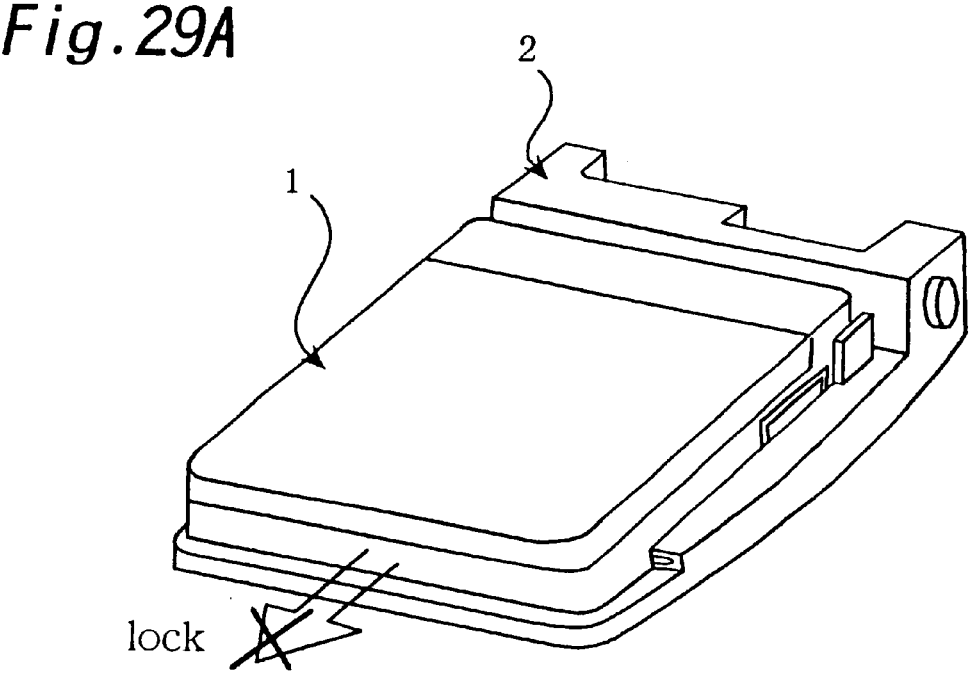
FIG. 29A is a perspective view showing a state where a notebook personal computer is set on the attachment device according to the present invention.
Figure 29B:
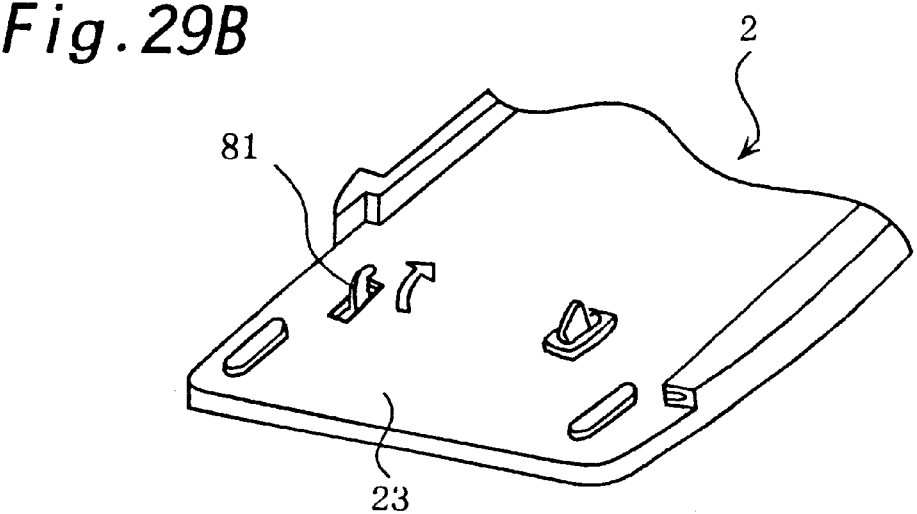
FIG. 29B is a perspective view showing a state where a rotation engaging claw is locked.

Consequently, the third back-and-forth sliding plate 293 slides back and forth as shown in FIGS. 26 and 27, whereby the rotation engaging claw 81 is rotated by a so-called relationship between a rack and a pinion, to obtain a state where the rotation engaging claw 81 falls and a state where the rotation engaging claw 81 rises. In a state where the rotation engaging claw 81 rises, a claw portion of the rotation engaging claw 81 is engaged with an engaging hole 12 formed on the bottom surface of the note PC 1, so that the note PC 1 is prevented from being removed. That is, in a state where the rotation engaging claw 81 falls as shown in FIGS. 28A and 28B, the note PC 1 is allowed to be removed. In a state where the rotation engaging claw 81 rises as shown in FIGS. 29A and 29B, the note PC is prevented from being removed.

(Second Rotating Plate)

As shown in FIGS. 5 and 6, one end of the second rotating plate 295 is connected to a position at some distance away from a right end of the first rotating plate 294 toward the shaft 294a. Further, the other end of the second rotating plate 295 is connected to the card shutter driving portion 27. The card shutter driving portion 27 is provided slidably back and forth. The second rotating plate 295 rotates upon receipt of a driving force by a rotating operation of the first rotating plate 294, to slide the card shutter driving portion 27 back and forth.

(Card Shutter Driving Portion)

A bending portion 27a is formed in the card shutter driving portion 27. The bending mounting portion 27a is formed on the right side of the guide surface of the guide portion 23a in the bottom supporting flat portion 23. That is, the bending mounting portion 27a is formed in the position where the note PC 1 is not prevented from being carried on the bottom supporting flat portion 23. Further, the bending mounting portion 27a is projected from a long hole 28a (see FIG. 4) formed in the resin cover 28. The card shutter 25 (see FIG. 4) is removably mounted on the bending mounting portion 27a. When the card shutter driving portion 27 slides forward (in the locked state), the card shutter 25 covers a part of the PCMCIA card loading aperture 1 1, as indicated by an imaginary line in FIG. 30. On the other hand, when the card shutter driving portion 27 slides backward (in the unlocked state), the card shutter 25 retreats from the PCMCIA card loading aperture 11 to open the loading aperture 11, as indicated by a solid line in FIG. 30.

Figure 31:
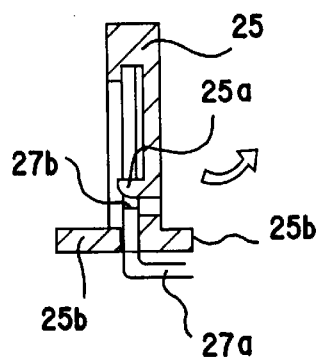
FIG. 31 is a longitudinal sectional view showing a state where a shutter plate is set on a bending portion of a shutter driving plate in the present invention.

FIG. 31 is a cross sectional view showing the card shutter mounted on the above-mentioned bending mounting portion 27a. An engaging hole 27b is formed in the bending mounting portion 27a. An engaging projection 25a of the card shutter 25 is fitted in the engaging hole 27b, so that the card shutter 25 is mounted on the bending mounting portion 27a. On the other hand, if a pin or the like is inserted into the engaging hole 27b to release the engaged state, the card shutter 25 can be detached from the bending mounting portion 27a.

Figure 30:
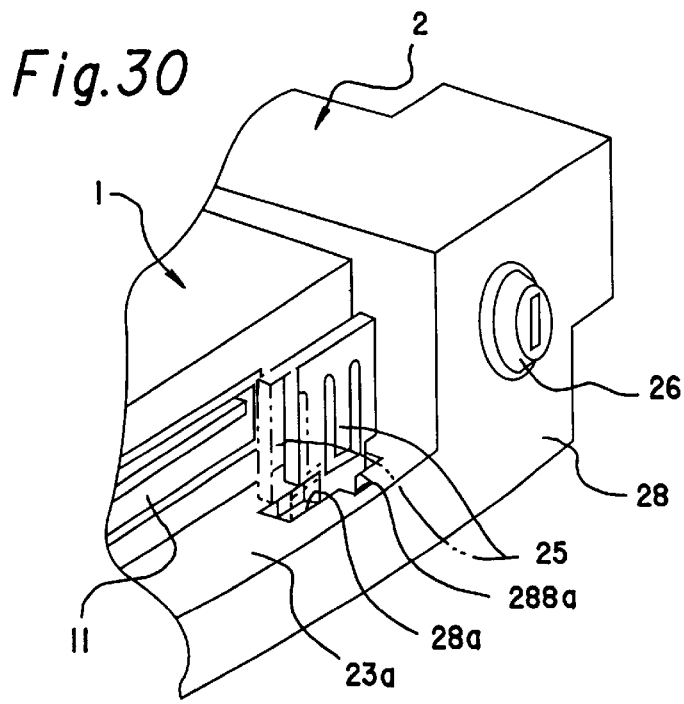
FIG. 30 is an enlarged perspective view showing how a card loading aperture of a notebook personal computer is opened and closed by a shutter plate in the present invention.

Furthermore, a projection portion 25b is formed in a lower part of the card shutter 25. A wide hole 288a corresponding to the projection portion 25b is formed, as shown in FIG. 30, in the long hole 28a. Consequently, the card shutter 25 can be attached and detached without removing the resin cover 28. The wide hole 288a is formed in correspondence to the position of the card shutter 25 in the unlocked state by the locking means 26, so that the card shutter 25 can be attached and detached only in the unlocked state.

The card shutter 25 for opening and closing the card loading aperture 11 is thus removably mounted on the bending mounting portion 27a of the card shutter driving portion 27. Even when the position of the card loading aperture 11 differs depending on the type of the note PC 1, therefore, the difference can be coped with by replacing the card shutter 25.

Figure 32A:
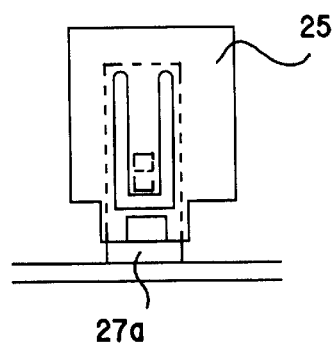
FIGS. 32A and 32B are explanatory views showing how the amount of projection of a shutter portion by a shutter plate is adjusted in the form of mounting of the shutter plate in the present invention.
Figure 32B:
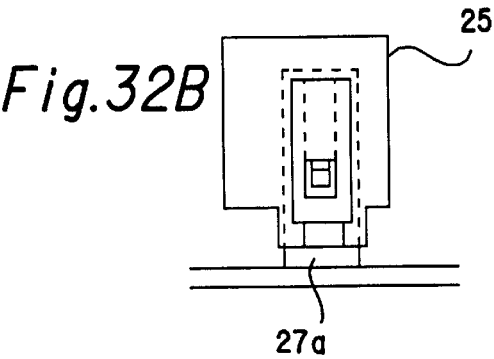

Furthermore, in the present embodiment, the amount of projection of one projected portion and the amount of projection of the other projected portion of the card shutter 25 from the bending mounting portion 27a of the card shutter driving portion 27 are made different, so that it can be chosen whether to take the one projected portion as a shutter functional portion or take the other projected portion as a shutter functional portion by a method of mounting the card shutter 25. That is, as shown in FIGS. 32A and 32B, the card shutter 25 is mounted upon being rotated through 180°, so that the amount of projection toward the card loading aperture 11 can be ad j Listed. When the position of the card loading aperture 11 differs depending on the type of the note PC 1, the difference can be coped with by one card shutter 25.

(Feature Expanding Unit)

Figure 13:
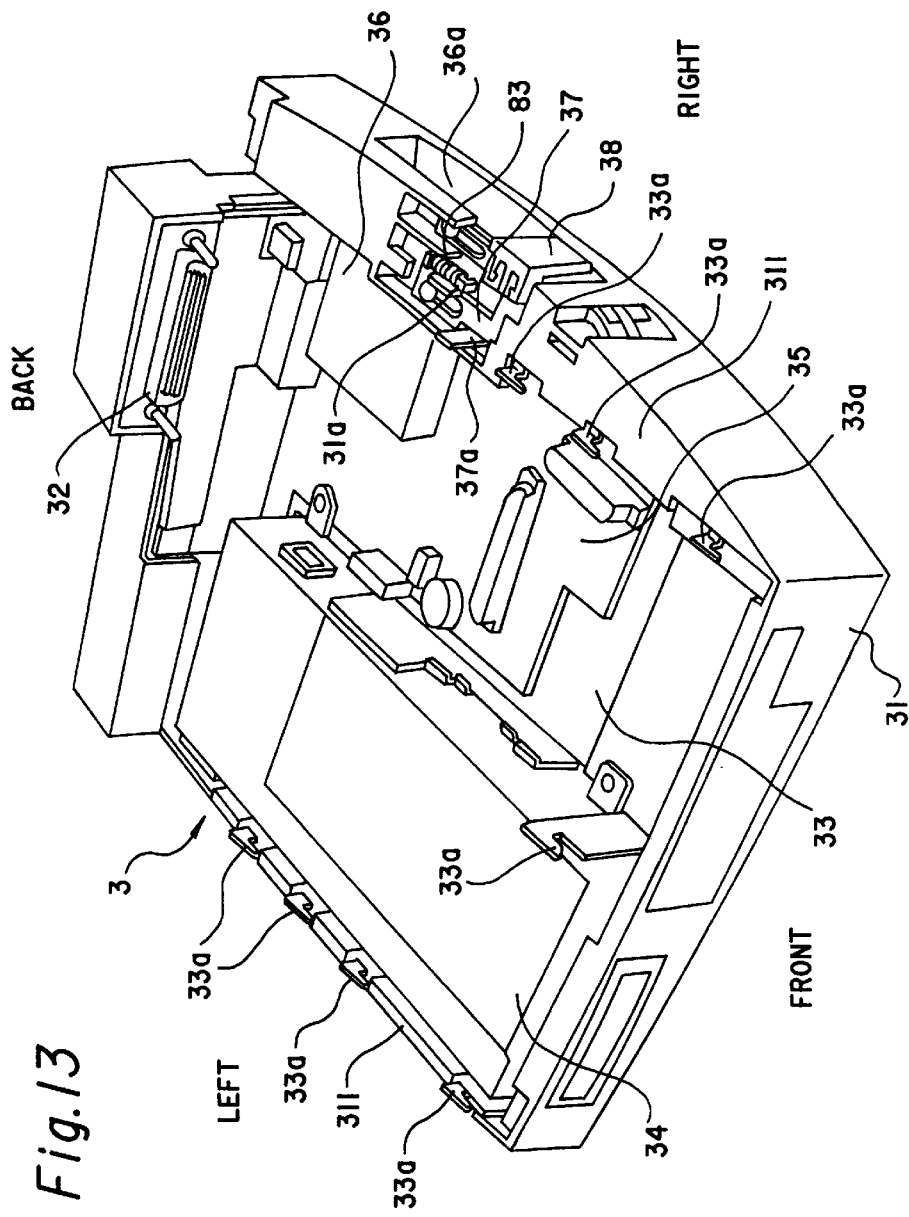
FIG. 13 is a perspective view showing in an enlarged manner the feature expanding unit of the portable electronic equipment according to the present invention.

FIG. 13 is a perspective view showing the feature expanding unit 3 in an enlarged manner. The box 31 comprises a peripheral wall member 311 composed of resin and a bottom 33 composed of an iron plate constituting its bottom surface. A power supply portion 34, a main substrate 35, a PCMCIA card loading aperture 36, and the like are arranged in the box 31, which are fixed to the bottom 33 by screws.

Hook-shaped projections 33a formed in the bottom 33 are projected on the upper surface of the box 3 1. When the attachment device 2 is mounted on the box 31, the hook-shaped projections 33a are engaged with the engaging hole 29e (which is not illustrated in FIG. 13) formed in the bottom 29.

Locking Relationship Between Feature Expanding Unit and Attachment Device

Figure 14:
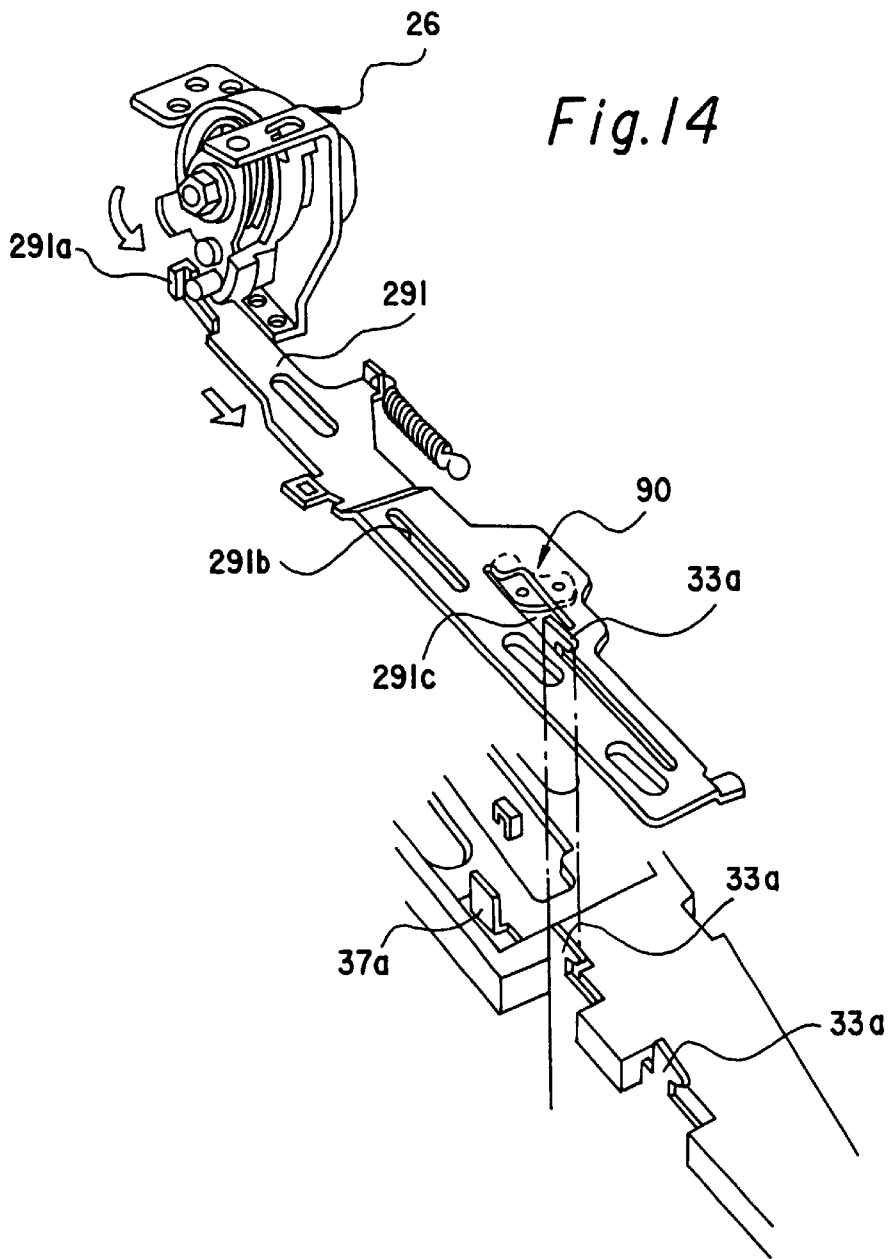
FIG. 14 is a perspective view showing the relationship between a first back-and-forth sliding plate provided in the attachment device of the portable electronic equipment according to the present invention and a hook-shaped projection provided in the feature expanding unit (a state at the time of unlocking)
Figure 15:
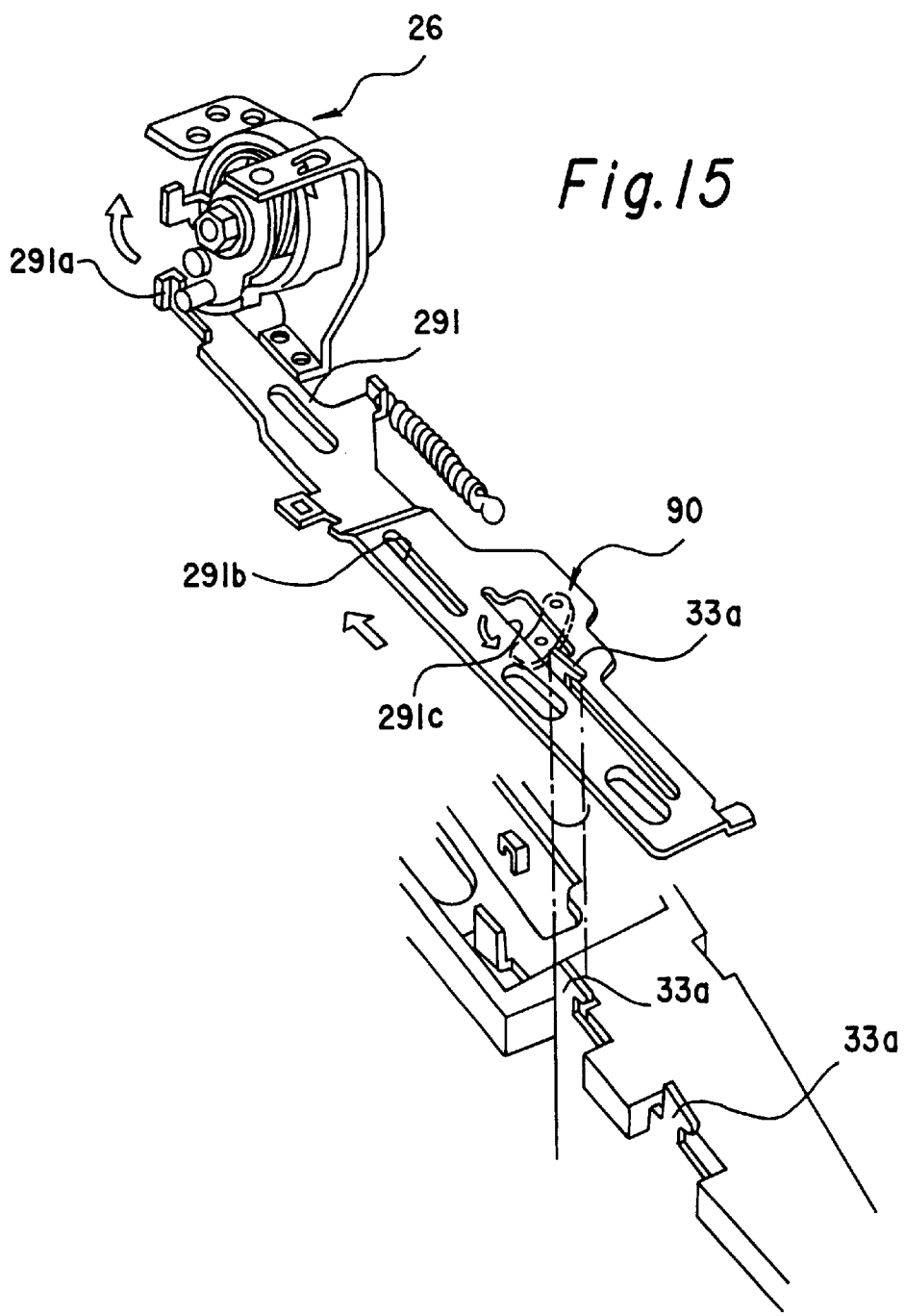
FIG. 15 is a perspective view showing the relationship between a first back-and-forth sliding plate provided in the attachment device of the portable electronic equipment in the present invention and a hook-shaped projection provided in the feature expanding unit (a state at the time of locking)

FIG. 14 is a perspective view showing a state where the engagement of an engagement operating portion 90 with the hook-shaped projection 33a is released, to unlock the attachment device 2. FIG. 15 is a perspective view showing a state where the engagement operating portion 90 is engaged with the hook-shaped projection 33a, to lock the attachment device 2. The hook-shaped projection 33a with which the engagement operating portion 90 is to be engaged is the hook-shaped projection 33a formed on the rearmost side out of the three hook-shaped projections 33a positioned on the right side of the box 31 in FIG. 13.

Figure 16:
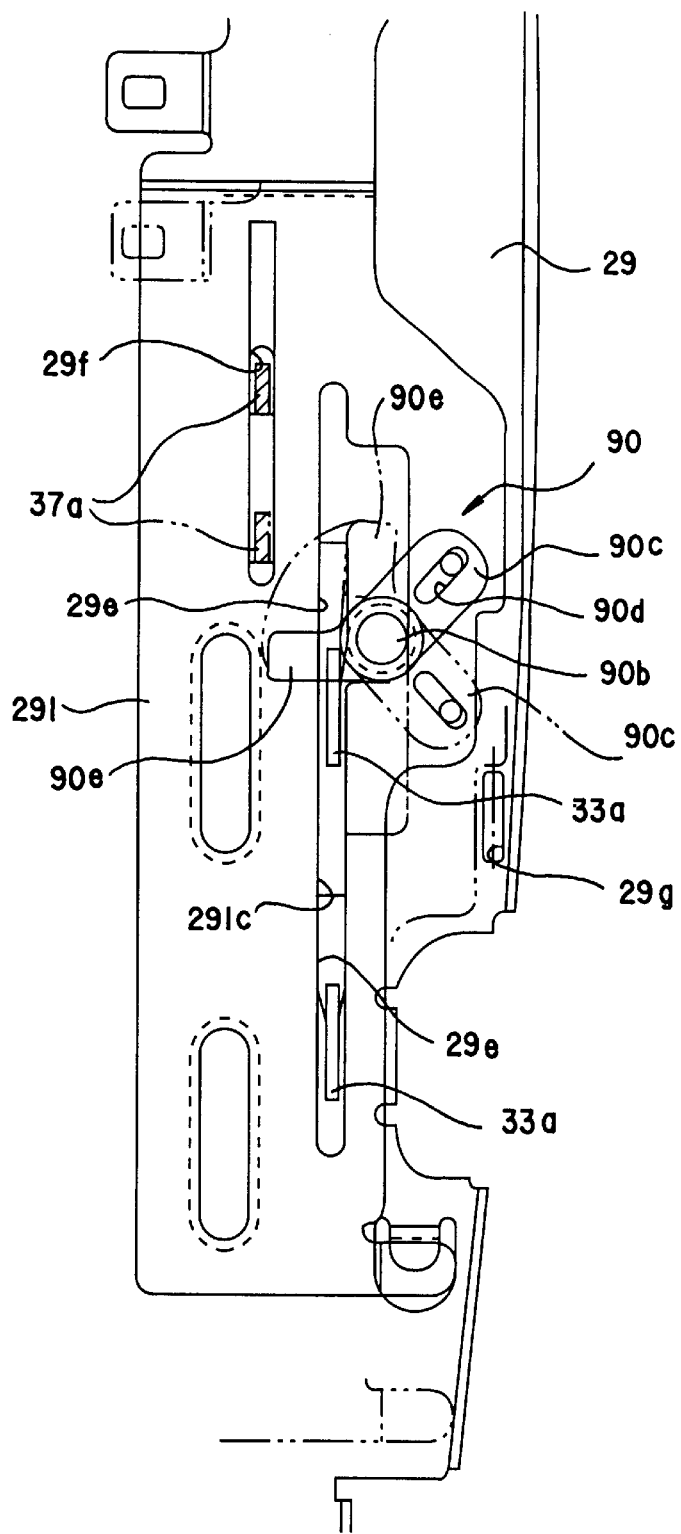
FIG. 16 is a plan view showing the relationship between a first back-and-forth sliding plate provided in the attachment device of the portable electronic equipment according to the present invention and a hook-shaped projection provided in the feature expanding unit (a state at the time of locking)

Specifically, the hook-shaped projection 33a with which the engagement operating portion 90 is to be engaged passes through the engaging hole 29e formed in the bottom 29, as shown in a plan view of FIG. 16, to lead to the vicinity of the engagement operating portion 90 driven by the first back-and-forth sliding plate 291. The engagement operating portion 90 has one portion 90c and other portion 90e in an approximately "<" shape. The engagement operating portion 90 is rotatably supported by a shaft 90b in its approximately central part, and a long hole 90d formed in the one portion 90c is connected to a projection of the first back-and-forth sliding plate 291.

In a position at the time of locking of the first back-and-forth sliding plate 291 as indicated by a solid line in FIG. 16, the other portion 90e of the engagement operating portion 90 is positioned at a rear end of the hook-shaped projection 33a, to prevent the attachment device 2 from being moved forward from the feature expanding unit 3, whereby the attachment device 2 can be prevented from being removed from the expanding unit 3. On the other hand, in a position at the time of unlocking of the first back-and-forth sliding plate 291 as indicated by an imaginary line in FIG. 16, the other portion 90e of the engagement operating portion 90 retreats from the rear end of the hook-shaped projection 33a, to allow the attachment device 2 to be removed. Ground connection between the attachment device 2 and the feature expanding unit 3 can be made by the contact between the bottom 29 and the hook-shaped projection 33a. If the engagement operating portion 90 is formed of a conductive material, and the engagement operating portion 90 and the hook-shaped projection 33a are brought into contact with each other in the locked state, the ground connection can be more reliably made.

(Shutter Driving Plate)

An innermost right edge (see FIG. 13) of the peripheral wall member 311 is so formed as to be projected toward the inside of the box 31. A shutter driving plate 37 is provided slidably back and forth on the upper surface of the projected portion. A shutter plate 38 serving as a shutter corresponding to the loading aperture 36a of the PCMCIA card loading portion 36 is mounted on a side edge of the shutter driving plate 37. The shutter plate 38 covers a part of the loading aperture 36a in the position where the shutter driving plate 37 retreats, while opening the loading aperture 36a in the position where it advances. The shutter driving plate 37 is urged in the direction of forward movement by a coil spring 83. In a state where a force against the coil spring 83 is not exerted, the shutter driving plate 37 advances, to open the loading aperture 36a. One end of the coil spring 83 is engaged with a projection 3 la formed in an upper right edge of the box 31.

A bending rising portion 37a is formed in the shutter driving plate 37. When the attachment device 2 is carried on the feature expanding unit 3, the bending rising portion 37a is engaged with a long hole 291b formed in the above-mentioned first back-and-forth sliding plate 291, as shown in FIGS. 11 and 12. Consequently, a driving force is applied to the shutter driving plate 37 by the first back-and-forth sliding plate 291 moved upon being operated by the locking means 26. When the first back-and-forth sliding plate 291 slides backward (in the locked state), the shutter driving plate 37 is moved backward against the urging of the coil spring 83, to cover a part of the loading aperture 36a by the shutter plate 38.

Figure 17:
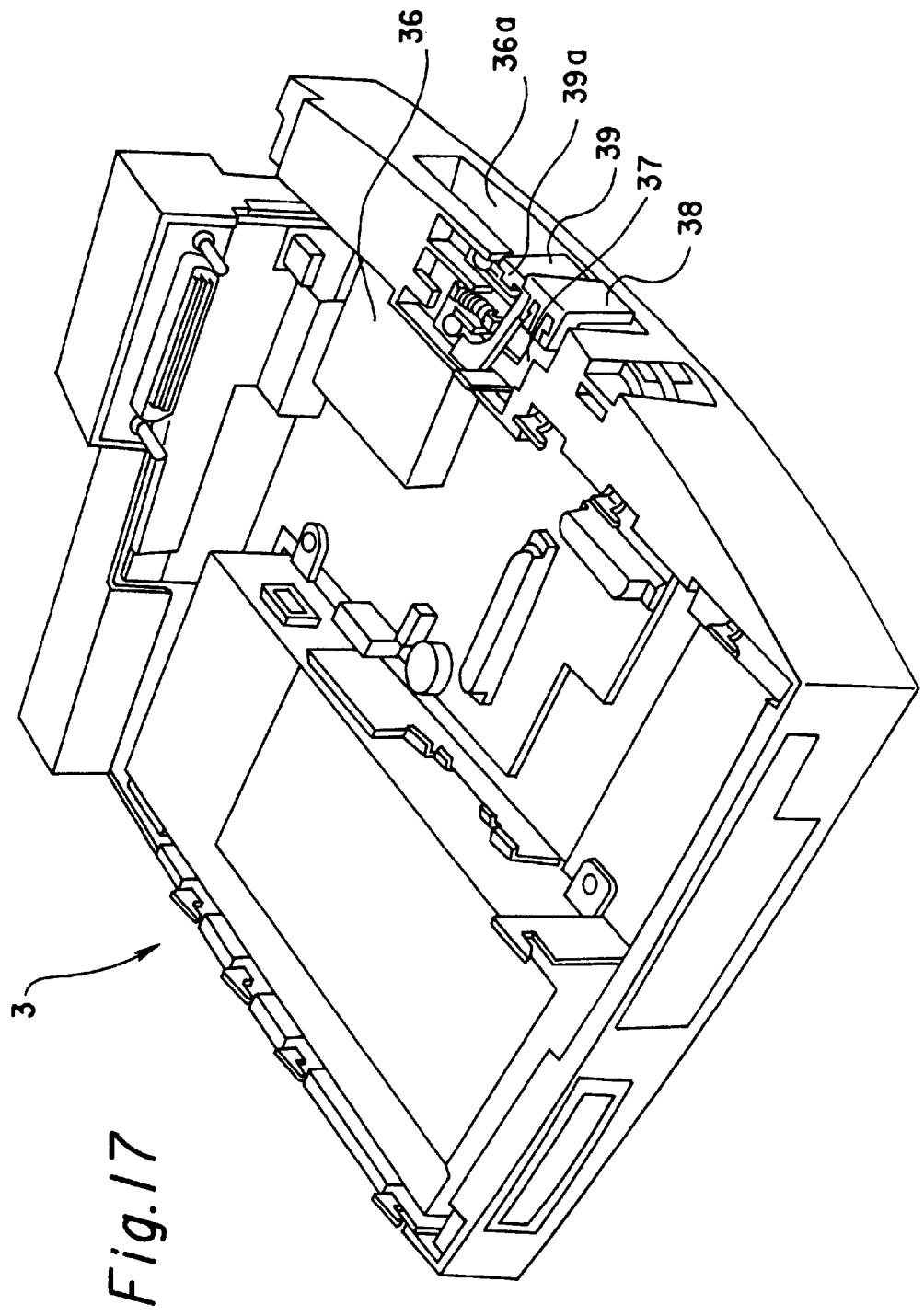
FIG. 17 is a perspective view showing a state where a stopper member is provided in FIG. 13.
Figure 19A:
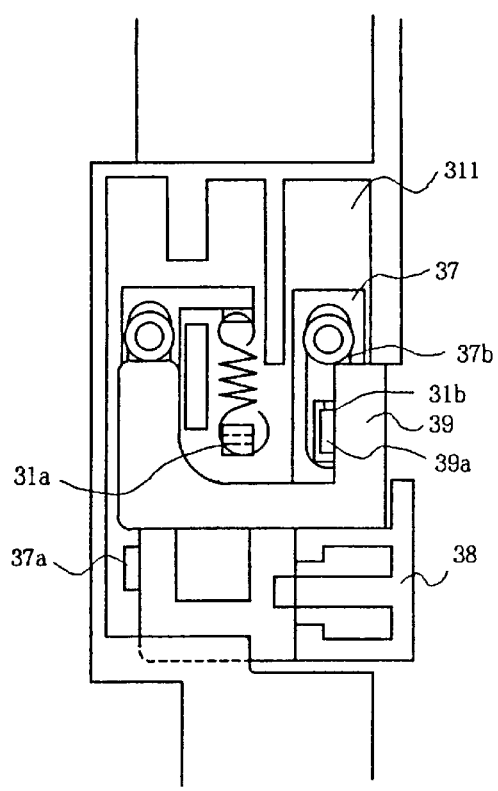
FIG. 19A is a plan view showing a state where a stopper member is provided in FIG. 18A.
Figure 19B:
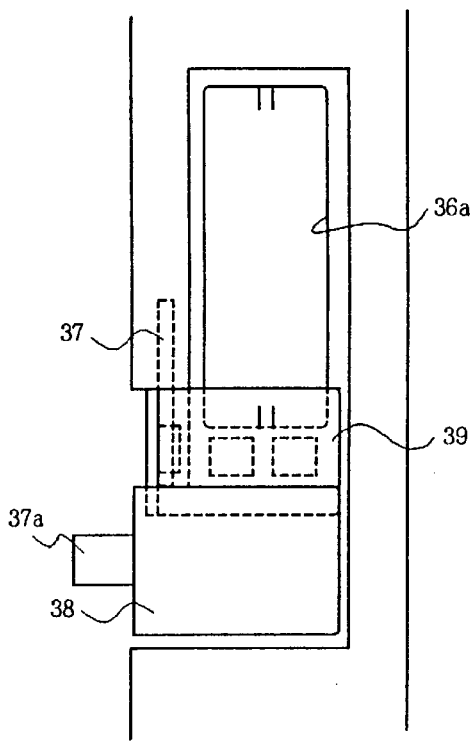
FIG. 19B is a side view thereof.

FIG. 17 is a perspective view of the feature expanding unit 3, which illustrates a state where a stopper member 39 for regulating the movement of the shutter driving plate 37 is mounted. A portion on this side of an upper part of the loading aperture 36a of the card loading portion 36 is notched by a portion corresponding to the moving range of the shutter plate 38. The stopper member 39 comprises a portion positioned on the upper surface of the shutter driving plate 37 and a shutter portion positioned in the notched portion for closing the loading aperture 36a. A projection 39a pro jected downward is formed in the portion positioned on the upper surface of the shutter driving plate 37a. The projection 39a is fitted in an engaging hole 31b, as shown in a plan view of FIG. 18A and a side view of FIG. 18B. The engaging hole 31b is formed on the upper surface of a projected portion of the peripheral wall member 311 in correspondence to the position where a guide hole 37b for guiding the shutter driving plate 37 back and forth. When the stopper member 39 is set on the shutter driving plate 37 in the unlocked state, therefore, the projection 39a is engaged with the engaging hole 31b, as shown in FIGS. 19A and 19B, to prevent the shutter driving plate 37 from sliding backward as well as to close a part of the loading aperture 36a in place of the shutter plate 38.

Figure 21:
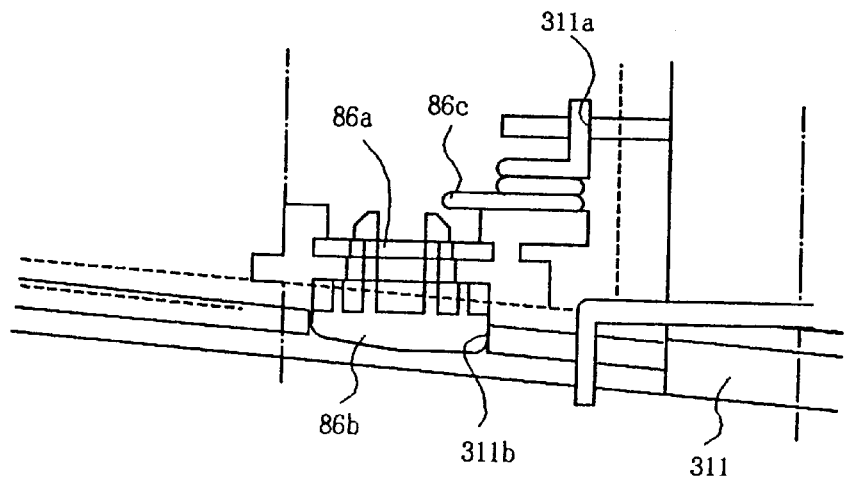
FIG. 21 is a plan view showing the locking member shown in FIG. 20 and its peripheral mechanism.
Figure 22:
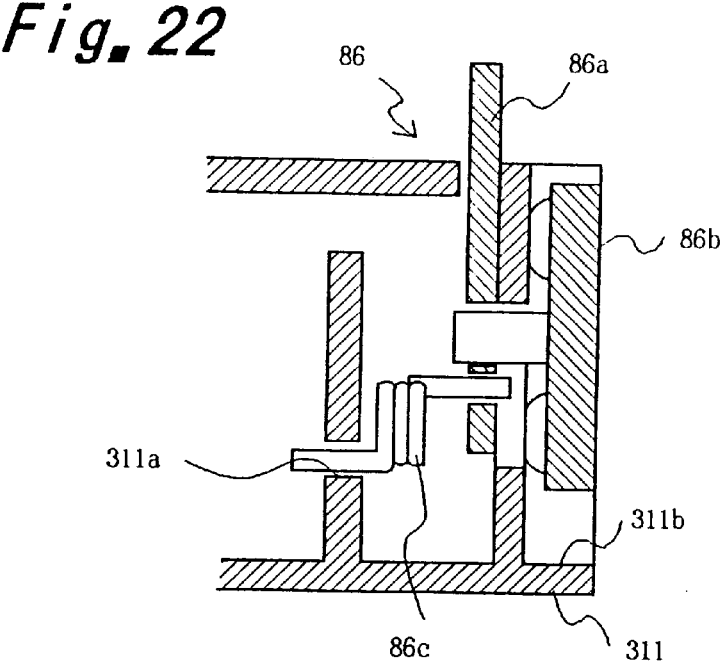
FIG. 22 is a cross sectional view showing the locking member shown in FIG. 20 and its peripheral mechanism.

FIG. 20 illustrates a state where a locking member 86a of a locking device 86 is projected from the upper surface of a right side of the peripheral wall member 311 in the feature expanding unit 3. The locking device 86 comprises the above-mentioned locking member 86a, a knob portion 86b, and a coil spring 86c, as shown in FIGS. 21 and 22. The knob portion 86b is fastened to a side surface of the locking member 86a, is exposed to a side surface of the peripheral wall member 311, and is provided slidably up and down by a guide groove 31 lb formed in the peripheral wall member 311. Further, the coil spring 86c has its one end engaged with a hole 31 la formed in the peripheral wall member 311, and has the other end engaged with the locking member 86a.

Figure 23A:
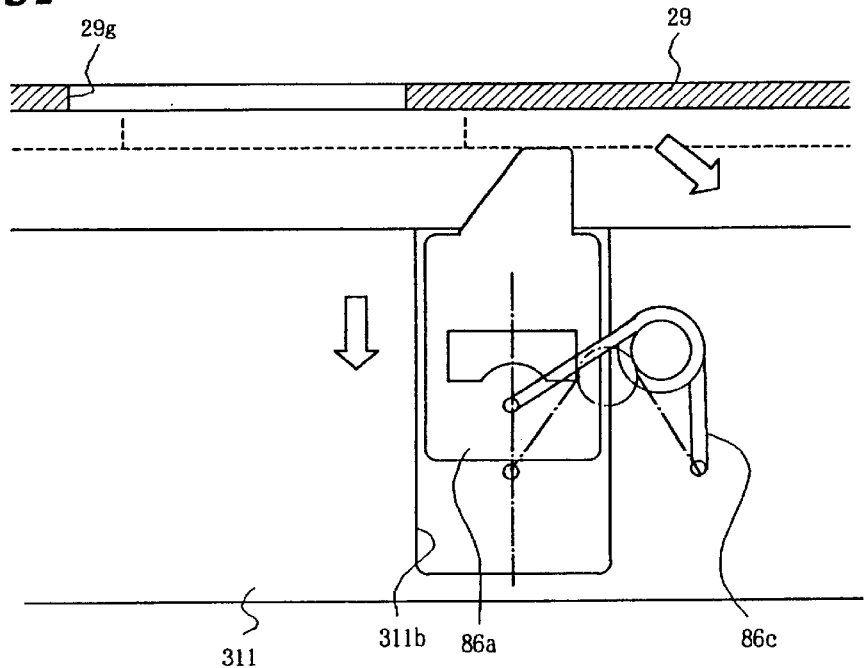
FIG. 23A is a side view showing a state where a locking member is projected.
Figure 23B:
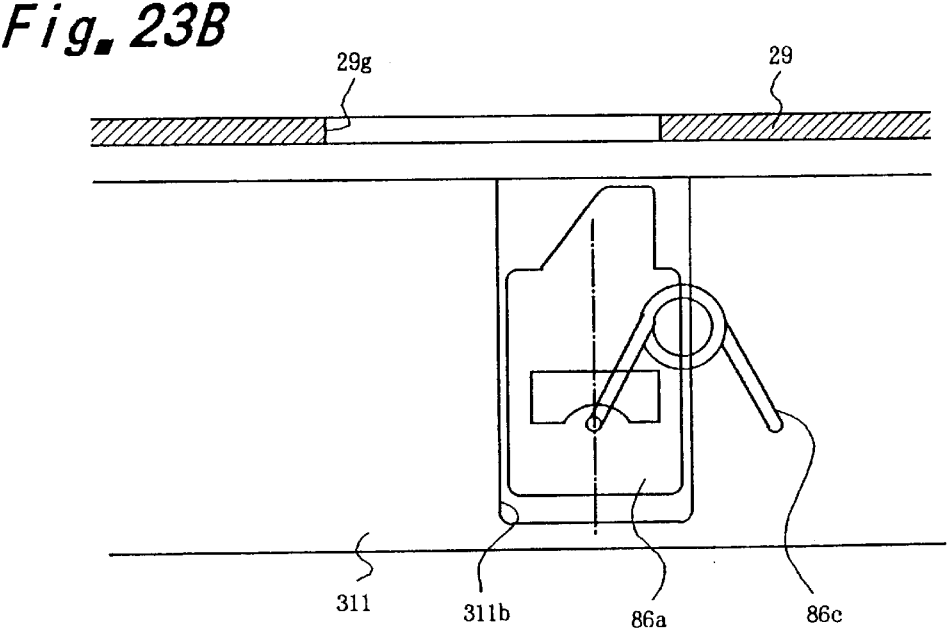
FIG. 23B is a side view showing a state where the locking member is retracted.

The coil spring 86c is so adapted that the spacing between the one end and the other end is smaller than spacing in a natural length state in a case where the locking member 86a is positioned in an intermediate position of vertical sliding. Consequently, in a state where the locking member 86a is upward beyond the intermediate position of vertical sliding, as shown in FIG. 23A, the locking member 86a is urged upward, whereby the projected state of the locking member 86a is held. In a state where the locking member 86a is downward beyond the intermediate position of vertical sliding, as shown in FIG. 23B, the locking member 86a is urged downward, whereby a state where the locking member 86a is retracted is held. When the locking member 86a is projected in a state where the attachment device 2 is mounted on the feature expanding unit 3, the locking member 86a is engaged with the engaging hole 29g formed in the bottom 29 (also see FIG. 16) in the attachment device 2, so that the forward movement of the attachment device 2 can be regulated.

Figure 33:
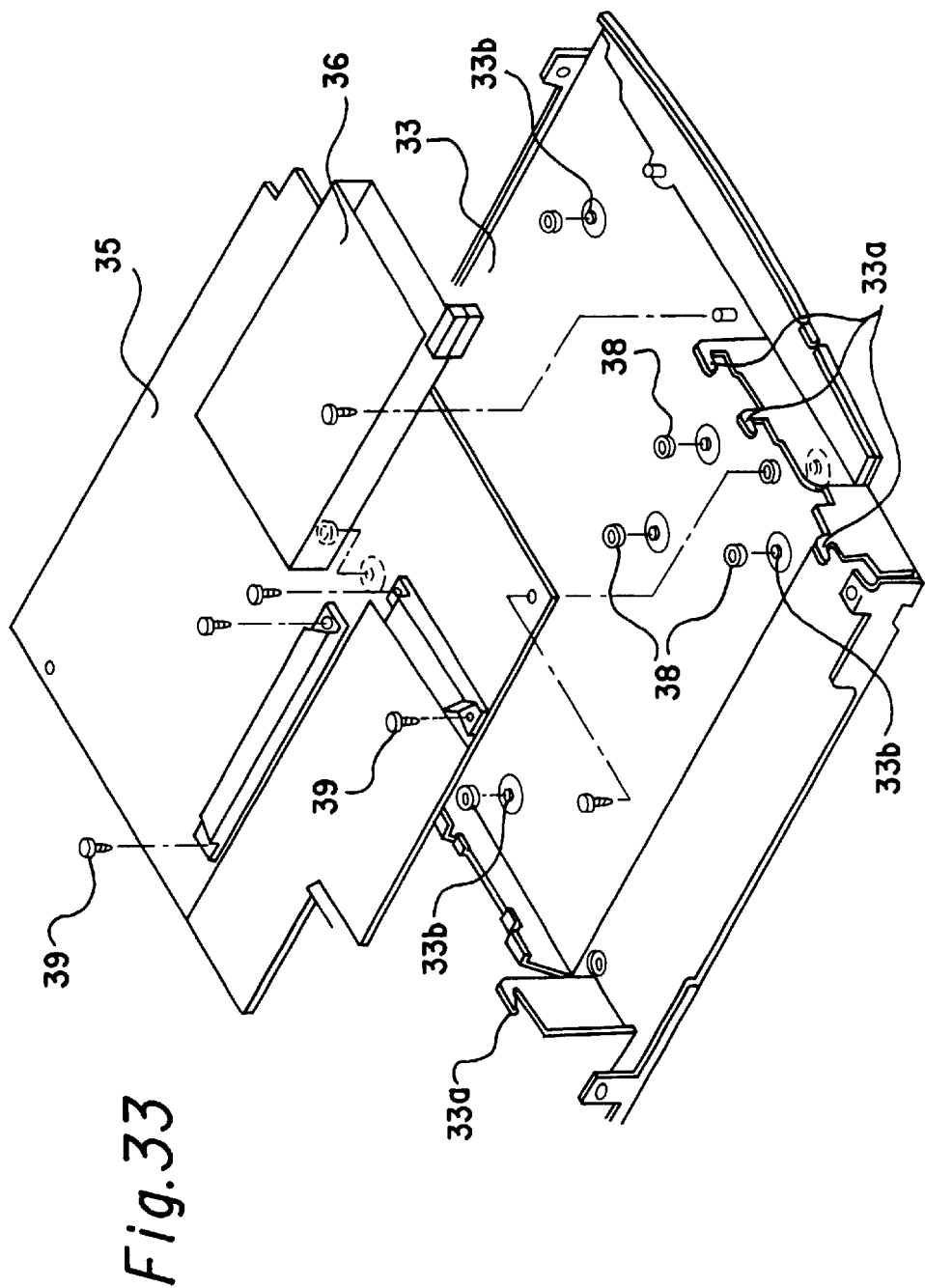
FIG. 33 is a perspective view showing a bottom of the feature expanding unit and a main substrate in the portable electronic equipment according to the present invention.
Figure 34:
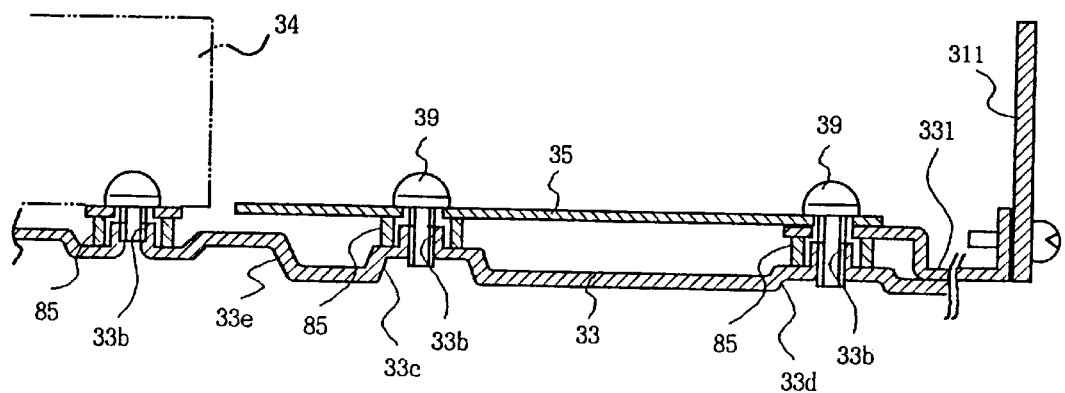
FIG. 34 is a cross-sectional view showing a bottom and a main substrate in the feature expanding unit of the portable electronic equipment according to the present invention.

FIG. 33 is a perspective view showing the bottom 33 and the main substrate 35. The main substrate 35 is mounted on the bottom 33 by screws 39. A projection 33b in which the screw 39 is screwed is directly formed in the bottom 33. A portion where the projection 33b is formed is pressed in an approximately domed shape so that at least a tip end of the screwed screw 39 is not projected from the lower surface of the bottom 33, as also shown in FIG. 34. Further, a spacer 85 having a larger thickness than that of the projection 33b is so arranged as to surround the periphery of the projection 33b so that the spacer 85 is interposed between the pressed portion and the main substrate 35.

The depths of all pressed portions are not made equal. For example, a pressed portion 33c and a pressed portion 33d in which the projections 33b for fixing the main substrate 35 are respectively formed differ in depth, and the pressed portion 33d is shallower, as shown in FIG. 34. For example, a supporting plate 331 for supporting the peripheral wall member 311 is so mounted as to be overlapped with the main substrate 35 in the pressed portion 33d, whereby the pressed portion 33d is shallower than the pressed portion 33c by the thickness of the supporting plate 331, so that the main substrate 35 can be arranged in parallel. That is, the pressed portions are made different in depth, so that the thicknesses of the spacers 85 can be made common. Consequently, the number of types of spacers 85 can be reduced.

On the other hand, a portion of the bottom 33 corresponding to the position where the power supply portion 34 is arranged is raised throughout, for example. In a portion of the projection 33b formed in the raised portion 33e, therefore, the portion of the bottom 33 is conversely pressed downward. The depth of the downward pressed portion is made smaller than the thickness of the spacer 85. Also in this portion, the spacer 85 having the same thickness as described above can be used.

As described in the foregoing, the attachment device 2 according to the present invention comprises the bottom supporting flat portion 23. In the bottom supporting flat portion 23, therefore, it is possible to form and arrange the guides 23a and 23b for introducing the note PC 1 into the port replicator portion 22, the grounding member 296 for grounding the note PC 1 and engaging the note PC 1, the engaging hole for engaging the attachment device 2 with the feature expanding unit 3, the finger catching portions 23c for making easy an operation performed when the attachment device 2 is removed from the feature expanding unit 3, and the like. Even when only the attachment device 2 is obtained, a function as a port replicator is obtained.

In the feature expanding unit 3 according to the present invention, the bottom supporting flat portion 23 in the attachment device 2 is mounted on the upper end surface of the box 31. Even if the feature expanding unit 3 is newly obtained after the attachment device is obtained, therefore, it is possible to gradually expand the function without making the attachment device 2 useless.

The separation type feature expanding device 4 according to the present invention can function as a port replicator and simultaneously as an expanding unit because it comprises the attachment device 2 and the feature expanding unit 3. If the separation type feature expanding device 4 is separated, it can be also used only as a port replicator in the attachment device 2.

As shown in FIG. 3, in a state where the attachment device 2 is mounted on the feature expanding unit 3, and the ISA card case 7 is mounted, the first locking hole 311a formed in the rising portion 311b in the function expanding unit 3, the second locking hole 225b formed in the locking portion 225 in the attachment device 2, and the third locking hole 7b formed in the ISA card case 7 are so positioned as to correspond to each other, and the feature expanding unit 3, the attachment device 2, and the ISA card case 7 are connected and locked by the connecting and locking means 5 by inserting the locking and engaging member 5a of the connecting and locking means 5 into the three holes to achieve locking (rotating the rotating portion 5b through 90°). The frame portion 255c surrounding the rising portion 311b and the rising portion 7a is formed in the periphery of the back surface of the locking portion 225. Even if an attempt to insert a driver or the like between the rising portion 311b formed in the feature expanding unit 3 and a surface forming the second locking hole (the back surface) of the attachment device 2 is made, it is possible to prevent the rising portions 311b and 7a from being destroyed to be stolen by making the insertion of the driver or the like difficult.

The engaging projection 33a is formed on the upper surface of the feature expanding unit 3, and an engaging hole 29e into which the engaging projection 33a is inserted is formed, as shown in FIG. 16, in the bottom 29 of the bottom supporting flat portion 23 in the attachment device 2. The bottom supporting flat portion 23 is provided with the first back-and-forth sliding plate 291 moved upon being operated by the locking means 26. The first back-and-forth sliding plate 291 is engaged with the engaging projection 33a through the engagement operating portion 90 by an operation performed at the time of locking by the locking means 26, to prevent the attachment device 2 from being moved forward on the feature expanding unit 3. In the locked state by the locking means 26, the attachment device 2 cannot be removed from the feature expanding unit 3, so that it can be prevented from being stolen.

Furthermore, the bottom supporting flat portion 23 in the attachment device 2 is provided with the first back-and-forth sliding plate 291 moved upon being operated by the locking means 26, the feature expanding unit 3 is provided with a shutter device comprising the shutter driving plate 37 moved by the first back-and-forth sliding plate 291 and the shutter plate 38 mounted thereon. The shutter plate 38 is driven by an operation performed at the time of locking by the locking means 26 so that the card loading aperture 36a of the card loading portion 36 is closed. In the locked state by the locking means 26, therefore, the PCMCIA card cannot be taken out from the feature expanding unit 3, so that the card can be prevented from being stolen.

Furthermore, the stopper member 39 for regulating the movement of the shutter plate 38 and closing the card loading aperture 36a in place of the shutter plate 38 is mounted on the shutter device. When the separation type feature expanding device 4 is shared among a plurality of users, one of the users may remove the note PC 1 from the attachment device 2, to remove the key 26a upon performing locking by the locking means 26, although the other user attempts to subsequently use the note PC 1 (the key 26a can be pulled out only in the locking position of the locking means 26). When the locking is achieved, the rotation engaging claw 81 is raised on the bottom supporting flat portion 23, whereby the note PC 1 cannot be mounted on the attachment device 2. At the time of sharing the separation type feature expanding device 4, if the stopper member 39 is mounted on the shutter device, the locking by the locking means 26 can be prevented. Even in the unlocked state by the locking means 26, the PCMCIA card cannot be taken out from the feature expanding unit 3, so that the card can be prevented from being stolen. In this case, the attachment device 2 and the feature expanding unit 3 can be prevented from being stolen by the above-mentioned connecting and locking means 5.

Furthermore, the feature expanding unit 3 is provided with the locking member 86a projected by a manual operation so that the respective states can be held and retracted by the weight of the attachment device 2. The engaging hole 29g into which the locking member 86a is inserted is formed on the bottom surface (the bottom 29) of the bottom supporting flat portion 23 in the attachment device 2. When the stopper member 39 is used, the locking by the locking means 26 is not performed, whereby the attachment device 2 may be uselessly removed from the feature expanding unit 3. If the locking member 86a is projected, therefore, the attachment device 2 can be prevented from being removed from the feature expanding unit 3 even if the locking by the locking means is not performed. Further, when an attempt to mount the attachment device 2 on the feature expanding unit 3 is made in a state where the locking member 86a is erroneously projected, the locking member 86a is retracted by the weight of the attachment device 2, whereby a mounting operation is performed without inconvenience.

Furthermore, the insertion hole 28b is formed in the resin cover 28 in a portion covering the locking means 26 in the attachment device 2, the ISA card case 7 is provided with the engaging projection 7d which can be inserted into the insertion hole 28b, and the locking means 26 is provided with the engaging member 26e engaged with the engaging projection 7d by an operation at the time of locking. The ISA card case 7 cannot be removed in the locked state by the locking means 26, whereby the card can be prevented from being stolen.

Furthermore, the note PC 1 can be engaged upon projecting the claw portion of the rotation engaging claw 81 from the bottom supporting flat portion 23 by an operation performed at the time of locking by the locking means 26. The rotation engaging claw 81 is rotated in a so-called relationship between a rack (the rack hole 293b of the moving plate) and a pinion (the gear portion 81a). Therefore, the distance between a center of rotation of the rotation engaging claw 81 and a point of application for applying torque to the rotation engaging claw 81 can be decreased, whereby the thickness of the bottom supporting flat portion 23 in the attachment device 2 can be reduced.

As shown in FIGS. 7A, 7B, and 7C, an operation for ejecting the note PC 1 can be performed subsequently to an operation for changing the locked state by the locking means 26 into the unlocked state. Therefore, the separation type feature expanding device can be made convenient for use.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A separation type feature expanding device of portable electronic equipment comprising:

an attachment device for the portable electronic equipment, said attachment device includes a bottom supporting flat portion on which the portable electronic equipment is mounted, and a port replicator portion provided in a rear end of the bottom supporting flat portion, said port replicator portion having a) a terminal portion to which a terminal portion provided on a back surface of said portable electronic equipment is removably connected, and b) locking means for fixing the portable electronic equipment to said attachment device; and a feature expanding unit for the portable electronic equipment said feature expanding unit includes one or more feature expanding means for the portable electronic equipment, an upper end surface on which the bottom supporting flat portion of said attachment device is mounted, a terminal portion to which the terminal portion of the port replicator portion is removably connected, and a card loading portion, wherein the bottom supporting flat portion of said attachment device is provided with a moving plate moved upon being operated by said locking means, said feature expanding unit is provided with a shutter driving plate moved by said moving plate, and said shutter driving plate is driven by an operation performed at the time of locking by the locking means so that a card loading aperture of said card loading portion is closed by a shutter plate mounted on the shutter driving plate.

2. A separation type feature expanding device of portable electronic equipment comprising:

an attachment device for the portable electronic equipment said attachment device includes a bottom supporting flat portion on which said portable electronic equipment is mounted, a port replicator portion provided in a rear end of the bottom supporting flat portion, said port replicator portion having a) a terminal portion to which a terminal portion provided on a back surface of the portable electronic equipment is removably connected, and b) locking means for fixing the portable electronic equipment to said attachment device;

a feature expanding unit for the portable electronic equipment, said feature expanding unit includes one or more feature expanding means for the portable electronic equipment, an upper end surface on which the bottom supporting flat portion of said attachment device is mounted, a terminal portion to which the terminal portion of the attachment device is removably connected and a terminal portion to which a terminal portion of the other equipment is removably connected; and a case carrying an electronic substrate having a terminal portion removably connected to the terminal portions of the feature expanding unit, wherein an insertion hole is formed in a cover portion covering the locking means in the attachment device, an engaging projection which can be inserted into the insertion hole in said cover portion is formed in the electronic substrate carrying case, and said locking means is provided with an engaging member engaged with said engaging projection by an operation performed at the time of locking.

3. An attachment device for a portable electronic equipment comprising:

a bottom supporting flat portion on which the portable electronic equipment is mounted;

a port replicator portion provided in a rear end of the bottom supporting flat portion, said port replicator portion having a) a terminal portion to which a terminal portion provided on a back surface of said portable electronic equipment is removably connected, and b) locking means for fixing the portable electronic equipment to said attachment device:

a rotation engaging claw having a gear portion is rotatably provided in the bottom supporting flat portion so that a claw portion can be projected from an upper surface of the bottom supporting flat portion a moving plate moved upon being operated by said locking means, the moving plate having a rack hole which is engaged with said gear portion, and the claw portion is projected from the bottom supporting flat portion by an operation at the time of locking performed by said locking means to engage said portable electronic equipment.

4. An attachment device for portable electronic equipment comprising:

a bottom supporting flat portion on which the portable electronic equipment is mounted;

a port replicator portion provided in a rear end of the bottom supporting flat portion, said port replicator portion having a) terminal portion to which a terminal portion provided on a back surface of said portable electronic equipment is removably connected, and b) locking means for fixing the portable electronic equipment to said attachment device;

a pressing projection for ejecting the portable electronic equipment is provided movably back and forth on a front surface of the port replicator portion;

an eject shaft is so provided in said bottom supporting flat portion as to have a center of a shaft in a lateral direction, wherein said pressing projection is moved back and forth by rotation of the eject shaft, and said eject shaft is rotated when the locking means is further operated in a direction of an operation performed when a locked state by the locking means is changed into an unlocked state.

5. An attachment device for portable electronic equipment comprising:

a bottom supporting flat portion on which the portable electronic equipment is mounted;

a port replicator portion provided in a rear end of the bottom supporting flat portion, said port replicator portion having a) a terminal portion to which a terminal portion provided on a back surface of the portable electronic equipment is removably connected, and b) locking means for fixing the portable electronic equipment to said attachment device;

a moving plate, moved upon being operated by said locking means, is connected to an upper case portion constituting a case of the bottom supporting flat portion;

an engaging projection is formed in a bottom constituting a bottom plate of said bottom supporting flat portion, and said moving plate is engaged with the engaging projection of said bottom in a locked state by said locking means.

6. A separation type feature expanding device for portable electronic equipment comprising:

an attachment device including:

a bottom supporting flat portion on which the portable electronic equipment is mounted; and a port replicator portion provided in a rear end of the bottom supporting flat portion, said port replicator portion having a terminal portion to which a terminal portion provided on a back surface of said portable electronic equipment is removably connected; and a feature expanding unit for the portable electronic equipment including:

one or more feature expanding means for the portable electronic equipment;

an upper end surface on which the bottom supporting flat portion of the attachment device is mounted; and a terminal portion to which the terminal portion of the port replicator portion in the attachment device is removably connected.

* * * * *